United States Patent [19]
Nakano et al.

[11] Patent Number: 4,752,677
[45] Date of Patent: Jun. 21, 1988

[54] CUSTOMER SERVICE SYSTEM FOR USE IN IC CARD SYSTEM

[75] Inventors: Harumi Nakano; Yoshimi Shigenaga, both of Tokyo, Japan

[73] Assignee: Casio Computer Co., Ltd., Tokyo, Japan

[21] Appl. No.: 909,284

[22] Filed: Sep. 18, 1986

[30] Foreign Application Priority Data

Sep. 25, 1985 [JP] Japan ................................ 60-211675
Sep. 25, 1985 [JP] Japan ................................ 60-211682

[51] Int. Cl.$^4$ ........................................... G06K 5/00
[52] U.S. Cl. ................................................. 235/380
[58] Field of Search .................... 235/380, 382, 382.5, 235/379

[56] References Cited

U.S. PATENT DOCUMENTS 3,971,916 7/1976 Moreno .
4,105,156 8/1978 Dethloff .

Primary Examiner—Roy N. Envall, Jr.
Attorney, Agent, or Firm—Frishauf, Holtz, Goodman & Woodward

[57] ABSTRACT

A customer service system for use in an IC card system comprises a customer's IC card, a display, a display controller, and a customer's IC card read-write unit. The IC card includes an IC having a first memory for storing an ID number, a second memory for storing secret data, an interface for controlling the input and output of data to and from the IC card, a comparator for comparing the input data with the ID number, and a controller for controlling the first and second memories, interface and comparator. The display controller supplies the items of a predetermined service menu to the display, and also supplies necessary data to the display in accordance with the item of menu selected by the customer. The unit includes a loading section for loading the IC card, a key pad for inputting data necessary to select one of the items of the menu and to perform the data exchange between the IC card and the unit, an interface for controlling the input of data to the IC card and the output of data from the IC card or from the key pad, and a controller for controlling the loading section, key pad and interface in accordance with the item of menu selected by the customer. The system can offer specific services, in addition to the ordinary transaction services, by giving the customer access to the first or second memory in accordance with the selected item of the menu when the comparator produces a coincidence output.

9 Claims, 19 Drawing Sheets

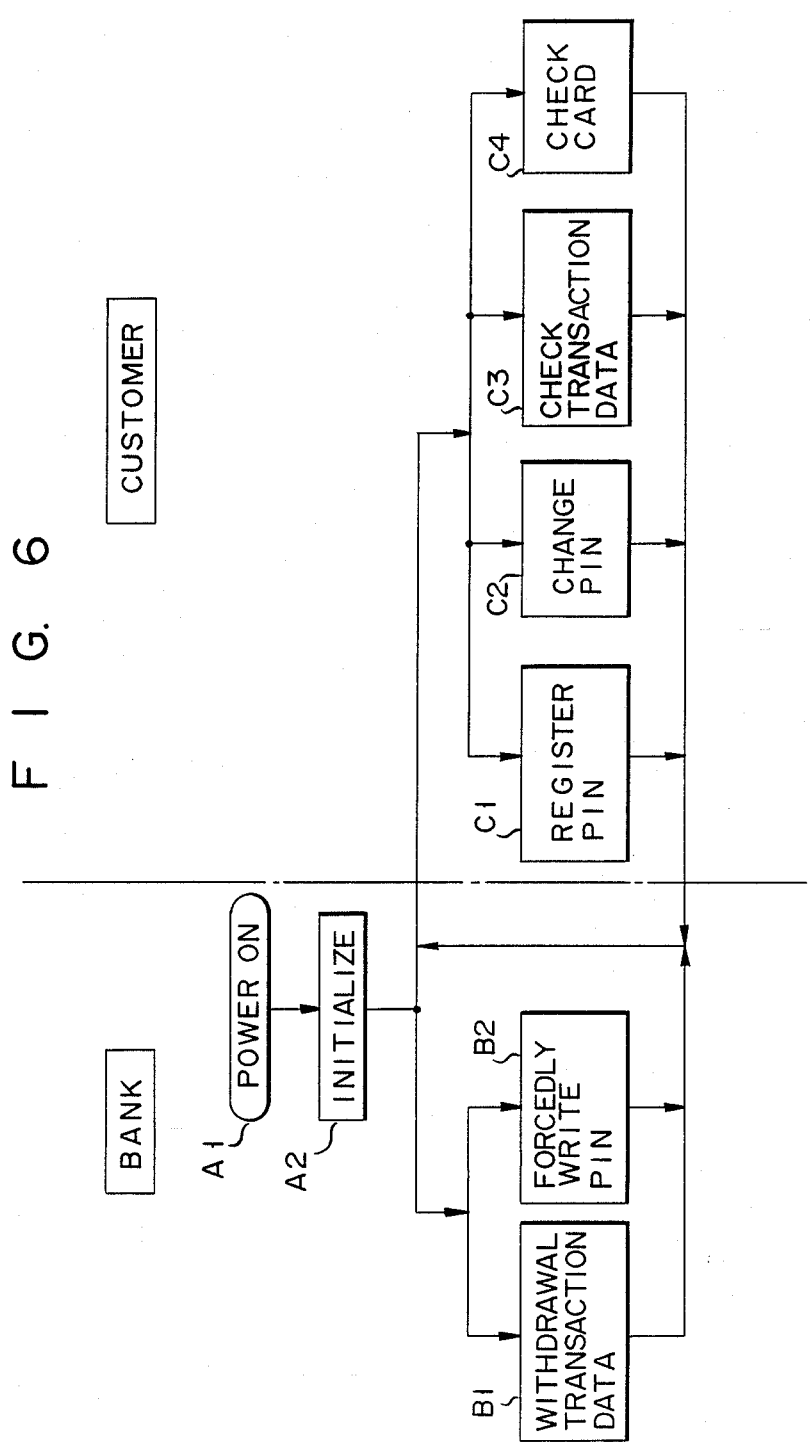

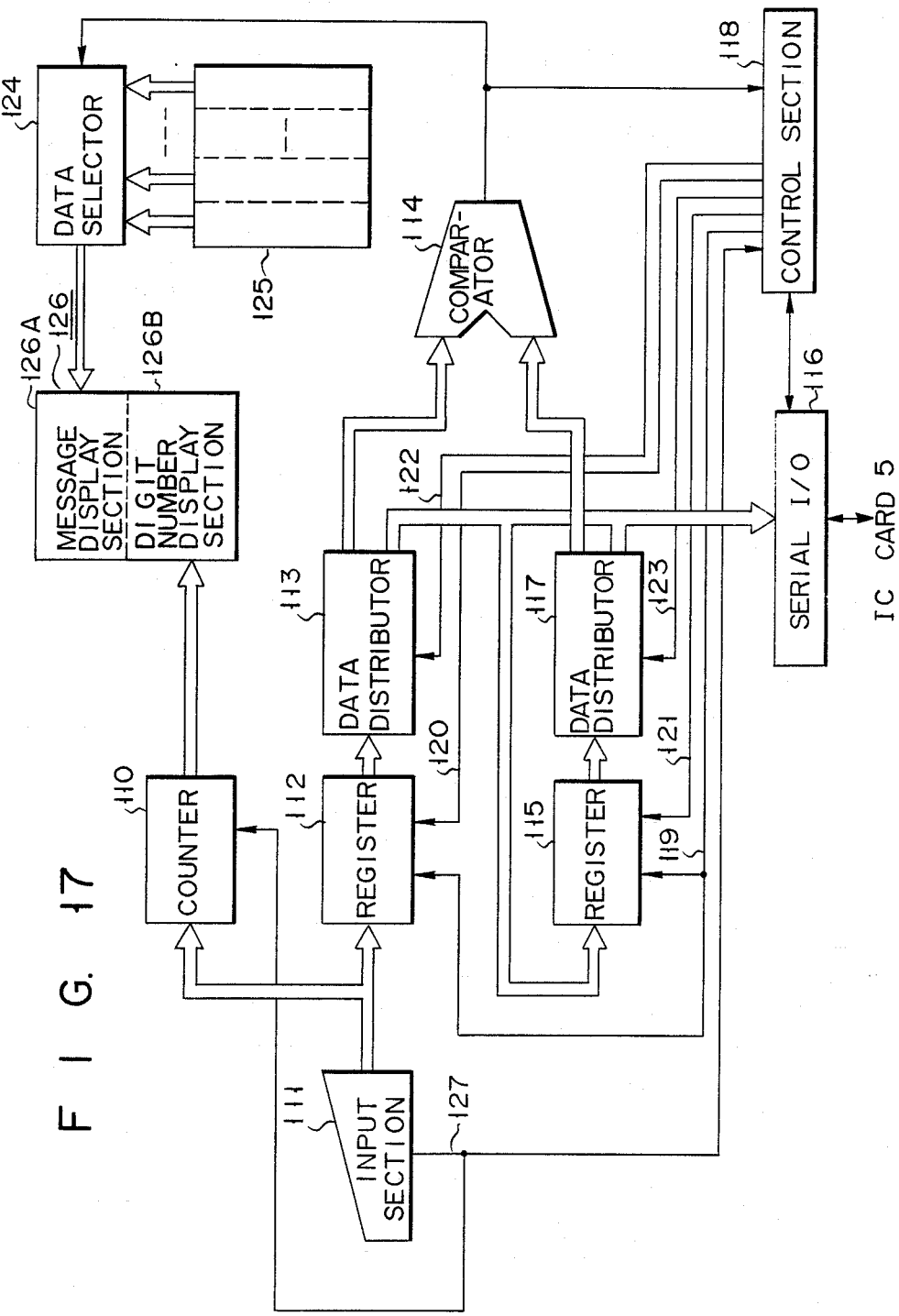
F I G. 17

CUSTOMER SERVICE SYSTEM FOR USE IN IC CARD SYSTEM

BACKGROUND OF THE INVENTION

This invention relates to a customer service system for use in an IC card system, which can provide IC card users (card holders) with services other than ordinary transactions at shops or the like. The invention also relates to an IC card system, which allows a card holder to register a personal identification number (PIN) in his or her IC card and to re-register this number, reliably and accurately.

The present time has been called a "cashless era." A variety of cards have been issued by credit companies or the like. Using these cards, customers can purchase commercial commodities.

Among these cards are plastic cards, embossed cards and cards having magnetic stripes. Such cards, however, can be easily forged.

It is therefore desirable to increase the security of these cards to prevent forging and deter illegal use thereof. To meet this demand, there has been developed a so-called IC card containing an IC circuit. The PIN is stored in the IC card in such a way that it can not be readily read from the card. Such an IC card is combined with an IC card terminal, providing an IC card system.

The IC card gives and receives data to and from an IC card terminal which is installed in a bank, shop, etc. for (1) identifying the card holder from the PIN, (2) verifying the IC card, (3) verifying the IC card terminal and (4) performing a transaction.

Such an IC card system is disclosed in detail in U.S. patent application Ser. No. 645,925 entitled "IC Card and An Identification Thereof" filed on Aug. 30, 1984 by the assignee of the invention.

The IC card system, however, has a drawback. If the IC card holder has forgotten his or her personal identification number, he or she can no longer be identified by using the IC card. Therefore, the IC card becomes virtuously useless. Further, should the PIN become known to any other person, it should be changed to prevent its illegal use, but in the invention described above, it cannot be altered. Further, the transaction history stored in the IC card cannot be readily confirmed.

The IC cards used in U.S. patent application Ser. No. 645,925 described above, are manufactured by a manufacturer, an issuer, and finally used by card holders. After manufacturing an IC card, the manufacture writes predetermined codes in the IC card by using an IC card terminal. Among the written codes are CA (Card Authenticator), IPIN (Initialization Personal Identification Number), PMK (Production Master Key) and PRK (Private Key code). The CA code is used for encryption and decryption of messages. The IPIN code consists of a random 6 bits, for instance, and is used until the PIN has been established. The PMK code is a manufacturer's number, used commonly for IC cards of the same lot. The PRK code is used for decryption of messages. After these codes have been written in the IC card, the PMK code is printed on a sheet of paper. The manufacturer sends the IC card and the sheet by separate mail to the issuer. The issuer writes a PAN (Primary Account Number) code in the IC card by using an IC card issuance terminal. More precisely, the issuer inputs the PMK code printed on the sheet into the terminal, and then inputs the PAN code into the terminal. The PAN code is stored in the card when the PMK code already written in the IC card is identical with PMK code input from the terminal. At the same time, the IPIN is read from the IC card and is printed on a sheet of paper. The issuer sends the IC card and the sheet by separate mail to the IC card holder. The IC card holder takes the IC card and the sheet to the issuer, and inputs his or her PIN code, using the IC card holder terminal installed in the card issuer's location. More precisely, the card holder inputs the IPIN code printed on the sheet into the terminal, and then inputs his or her PIN code into the terminal. The PIN code is written into the IC card when the IPIN code input to the terminal is identical with the IPIN code already written into the IC card. After the above processes have been effected, the IC card can be used.

If the IC card holder mistakenly writes a wrong PIN code into the IC card, the IC card will later be rejected when the card is inserted in the terminal and the card holder inputs the correct PIN to the terminal. There is another problem. When the card holder inputs the PIN code to the terminal in a bank or the like, there may be other persons near the terminal. These persons may see the PIN. This can spoil security of the IC card. To preserve the security of the IC card, the PIN can be re-entered. However, it is possible that the card holder is again liable to mistakenly enter a wrong number as the new PIN code, thus disabling the subsequent use of the IC card.

SUMMARY OF THE INVENTION

It is, therefore, an object of the invention to provide a new and improved customer service system for use in an IC card system, which can improve the functions of the IC card system and promote the convenience for the IC card users by providing the customers with special services, in addition to the ordinary transaction services, such as alteration of the PIN, and access to transaction data, in co-operation with the IC card issuer (e.g., bank) in case of necessity.

Another object of the invention is to provide an IC card system, which permits the registration or alteration of the PIN data in the IC card by the IC card holder reliably and accurately.

According to the invention, there is provided a customer service system for use in an IC card system comprising:

a customer's IC card including at least an IC circuit having first memory means for storing the personal identification number of a customer, second memory means for storing secret data, interface means for controlling the output of data from said IC card and input of data to said IC card, comparator means for comparing data input through said interface means with data stored in first memory means, and control means for controlling said first and second memory means, said interface means and comparator means in accordance with selective execution of a plurality of predetermined items of a customer service menu;

display means;

display control means for causing said display means to display the items of the customer service menu and to display necessary data including messages, once or repeatedly, in accordance with selective execution of said items of the menu; and customer's IC card read-write means including a loading section for loading said customer's IC card, a key input section for inputting data necessary to select one of said items of the customer service menu displayed on said display means under the control of said display control means and to exchange data between said customer's IC card read-write means and said customer's IC card loaded in said loading section, an interface section for controlling the output of data to said customer's IC card or to said display control means, and the input of data from the customer's IC card or from the key input section, and a control section for controlling said loading section, key input section and interface section in accordance with the selective execution of said items of the customer service menu;

whereby said customer service system provides predetermined services in addition to ordinary transaction services to the customer, by permitting access to said first and second memory means in accordance with one of the selected item of the customer service menu when said comparator means produces a coincidence output.

BRIEF DESCRIPTION OF THE DRAWINGS

These and other objects and features of the present invention can be understood through the following embodiment by references to the accompanying drawings, in which:

FIG. 6 is a flow chart illustrating operation of the system according to the invention;

FIG. 17 is a block diagram showing the circuit of the terminal;

DETAILED DESCRIPTION OF THE PREFERRED EMBODIMENTS

[FIRST EMBODIMENT]

Now, a first embodiment of the invention will be described with reference to the drawings.

Structure of the Customer Service System

Figure 1:
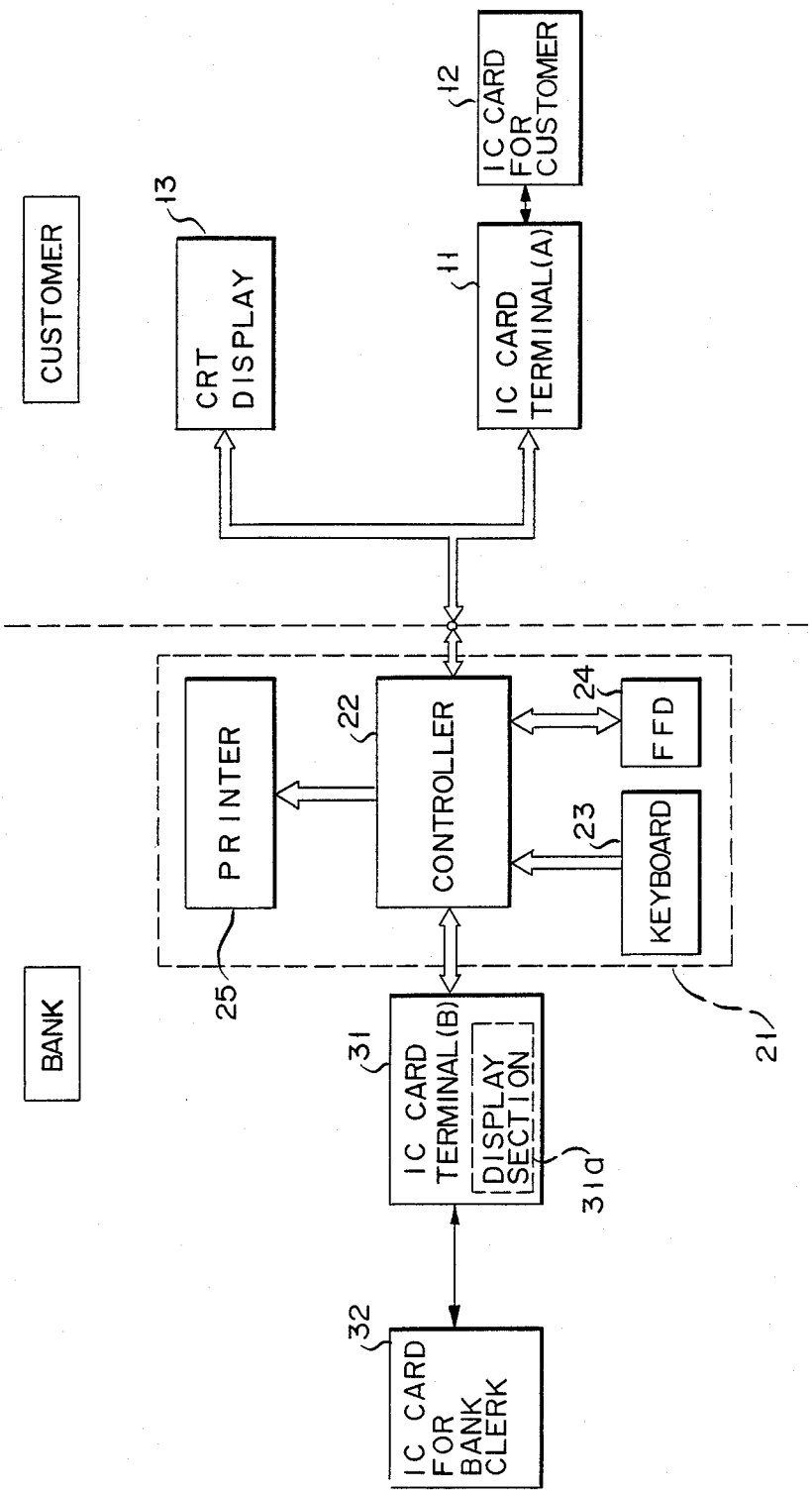
FIG. 1 is a schematic representation of a first embodiment of the system according to the invention.

FIG. 1 is a view showing the structure of a first embodiment of the invention.

IC card terminal 11 is be installed in a bank. Customer's IC card 12 can be loaded in terminal 11, so that data can be transferred between IC card 12 and IC card terminal 11. When the card holder inputs a PIN to terminal 11, he or she can:

(1) write the PIN in the IC card if no PIN's have been previously stored in IC card 12, (2) replace the PIN already in IC card 12 with the newly-input PIN (PIN alteration), (3) check the transaction data stored in IC card 12, and (4) check the internal state of IC card 12.

IC card terminal 11 is connected to CRT display 13. CRT display 13 can display the menu, i.e., processes (1) to (4) noted above, the transaction data stored in the IC card as well as the guidance of terminal operation. IC card terminal 11 and CRT display 13 are connected to central control unit 21 installed at the counter of the bank. Central control unit 21 is either an office computer or a personal computer. It includes controller 22, keyboard 23, floppy disk device (FDD) 24 and printer 25. Central control unit 21 is connected to IC card terminal 31 which is operated by an authorized bank clerk.

Central control unit 21 controls IC card terminals 11 and 31 as shown by flow charts to be described later.

IC card terminal 31 can exchange data with the bank clerk's IC card 32. Terminal 31 actuates IC card terminal 11 so that terminal 11 can read the transaction data from IC card 12, and perform a forcible writing of PIN data into IC card 12.

IC card terminal 31 has a display section 31a, unlike that of IC card terminal 11.

Outer Appearance of the Terminal

Figure 2:
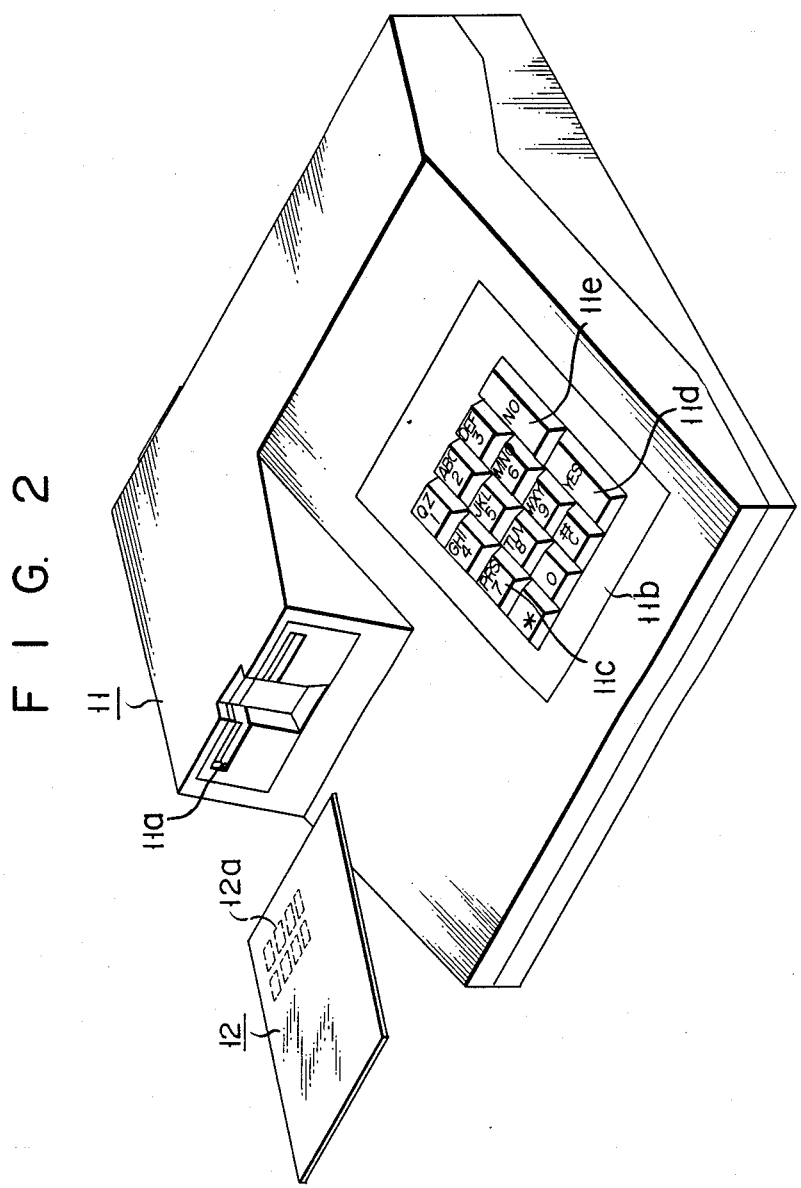
FIG. 2 is a perspective view of a card holder's IC card and an IC card terminal.
Figure 3:
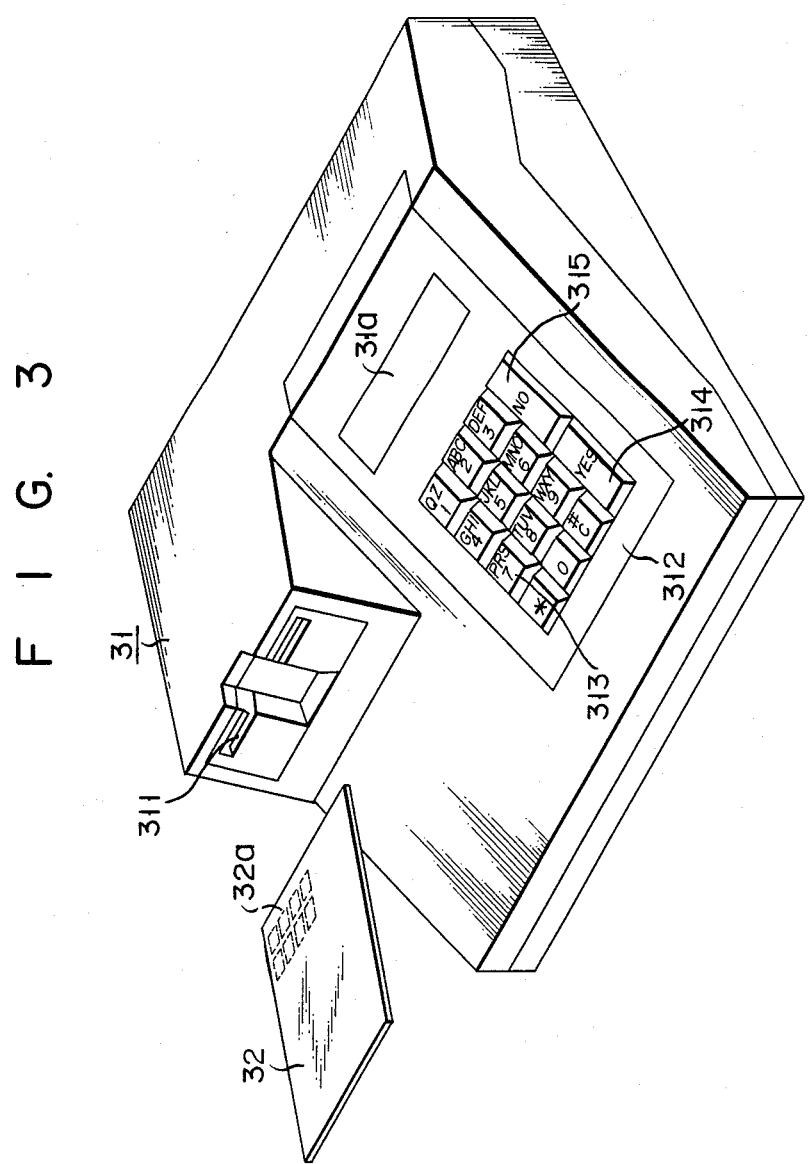
FIG. 3 is a perspective view of a bank clerk's IC card and an IC card terminal.

FIG. 2 shows the outer appearances of IC card terminal 11 and IC card 12. FIG. 3 shows the outer appearances of bank clerk's IC card terminal 31 and bank clerk's IC card 32.

IC card terminal 11 has IC card inlet 11a and keyboard 11b. Keyboard 11b has numerical key pad 11c, YES key 11d and NO key 11e. IC card 12 has eight connectors 12a. Actually, only six connectors of connectors 12a are used; the remaining two connectors are not presently used.

Bank clerk's IC card terminal 31 has IC card inlet 311 and keyboard 312, like IC card terminal 11 shown in FIG. 2. Keyboard 312 has numerical key pad 313, YES key 314 and NO key 315. Further, terminal 31 has display section 31a.

IC card 32 also has eight connectors 32a, only six of which are used presently.

Circuit of IC Card

Figure 4:
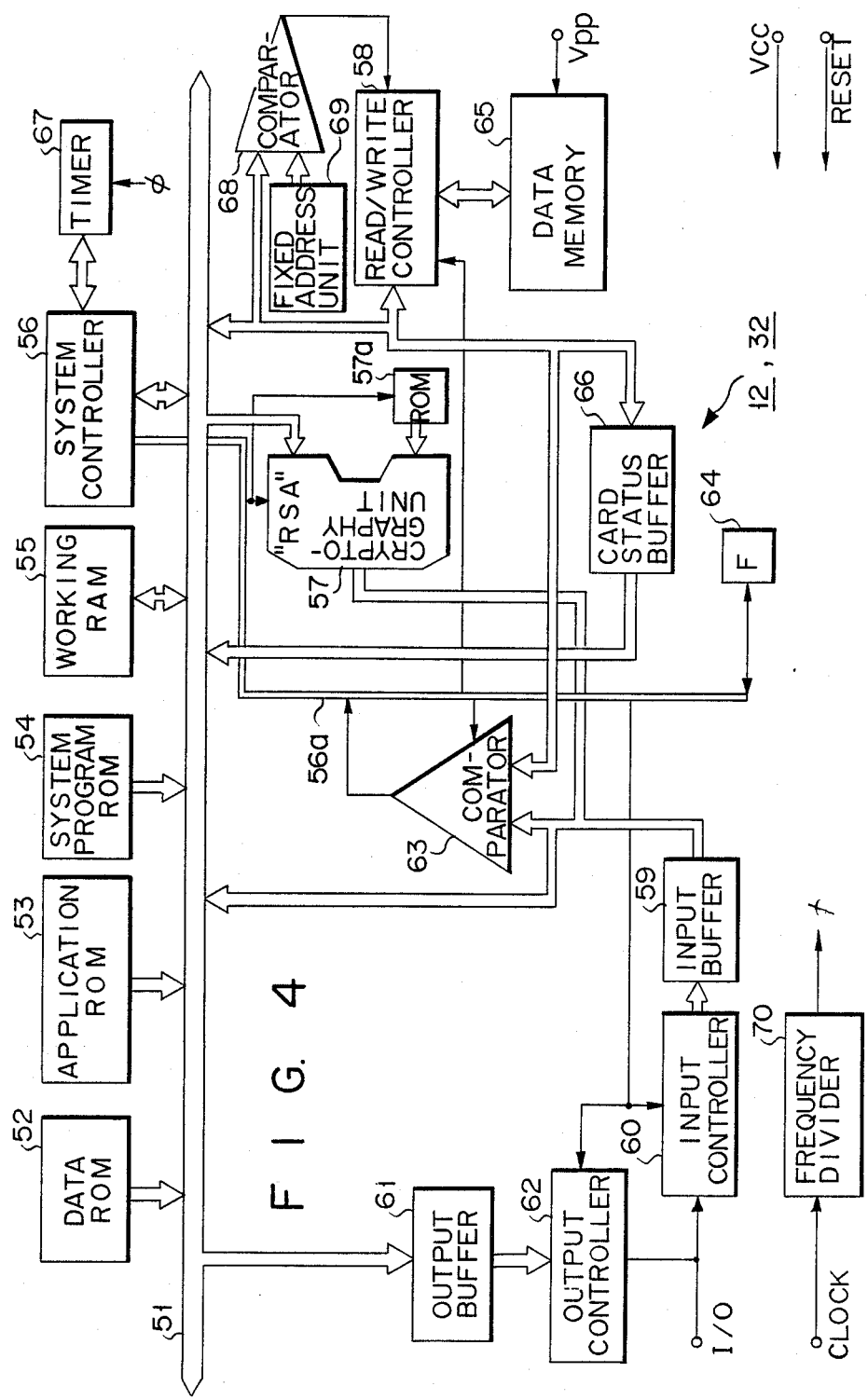
FIG. 4 is a circuit diagram of the card holder's IC card and bank clerk's IC card.

FIG. 4 shows the IC circuits provided in customer's IC card 12 and bank clerk's IC card 32. As these IC circuits are identical, only one of them will be described.

The circuit shown in FIG. 4 has system bus 51. Data ROM 52, application ROM 53, system program ROM 54, working RAM 55, system controller 56, RSA decryption unit 57, read/write controller 58, input buffer 59 and output buffer 61 are connected to system bus 51. Input controller 60 is connected to input buffer 59. Output controller 62 is connected to output buffer 61. Data input/output terminal I/O is connected to input controller 60 and output controller 62.

Data ROM 52 stores data representing all operating conditions of IC card 12 (or 32), such as data-writing voltage, tolerance current thereof, maximum application time, maximum quantity of data transfer, and maximum response time. When the initialization of the IC card is completed, the operating condition data is transmitted to terminal 11 or 31 as answer-to-reset data, in a predetermined format adopted as a terminal protocol.

Application ROM 53 stores the APN (application name) data indicative of the application of the IC card. The APN data is transmitted in a predetermined format at the time of data exchange between terminals 11 and 31 after initial parameters have been set in terminals 11 and 31 in accordance with the answer-to-reset data. The APN data for IC card 12 is different from the APN data for bank clerk's IC card 32.

System program ROM 54 stores ACK code, showing that a signal from terminal 11 or 31 is correct, and NAC code, indicating that the signal is incorrect. ROM 54 also stores various system programs.

System controller 56 has a judgement area, and it supplies the data reception signal input through input buffer 59 and also operation commands to some of the other components of the IC circuit.

The RSA decryption unit 57 performs decryption of data on the basis of a well-known RSA algorithm. More specifically, it decrypts the input data supplied from IC card terminals 11 and 31 through input buffer 59, according to the issuer's private key codes for decryption stored in key code memory (ROM) 57a, and supplies the decrypted data to the secret data comparator. The output data from comparator 63 is supplied to system control line 56a of system controller 56. Flag 64 is connected to system control line 56a and operates according to the output data of comparator 63.

Read/write controller 58 controls the writing and reading of data in and from data memory 65, according to commands form system controller 56. The data read from read/write controller 58 is supplied to comparator 63, system bus 51 or card status buffer 66.

Data memory 65 is, for example, an electrical erasable programmable - read only memory (EEP-ROM). CA, IPIN, PAN, CHN, EPD, PRK and RTN codes and ST (status) data are written in the memory areas of data memory 65. CHN stands for "card holder's name", and EPD for "expiration date." RTN code represents the number of times of inputting of erroneous data. The ST data indicates the present status of IC card 12 (or 32). This data shows, upon completion of the manufacturing process, that the IC card has been manufactured. It is PIN non-registration data if the PIN has not yet been written in the IC card. The ST data is transmitted in the same data format as the APN to terminal 11 or 32. Data memory 65 is not limited to the EEP-ROM; it can be an erasable programmable - read only memory (EPROM). Further, IC card 12 has a TRA (transaction area) for storing transaction data, the dates of transactions, etc.

Timer 67 is connected to system controller 56. When a command for starting the supply of data-writing voltage is given to IC card terminal 11 or 31 to perform a transaction data exchange, for instance, timer 67 counts a predetermined time. When ACK code is supplied from terminal 11 or 31, system controller 56 prohibits both the input and output of data to and from IC card 12 (or 32).

The bus line connecting read/write controller 58 and system bus 51 is connected to address comparator 68. Address comparator 68 compares the unused address preset in fixed address unit 69 with the address designated by system bus 51 at the end of the test carried out on the IC card after the manufacture thereof by the manufacturer. The output of comparator 68 is supplied to read/write controller 58. When the compared addresses are identical, as in the case of an illegal use of the terminal, all data stored in data memory 65 is cleared, thus preventing an undesired readout of secret data from the IC card.

When IC card 12 is loaded into terminal 11, or IC card 32 is loaded into terminal 31, reset signal Reset and system clock signal Clock are supplied from terminals 11 (or 31) through connectors 12a (or 32a) of the IC card. At the same time, $V_{CC}$ power supply and $V_{pp}$ power supply are connected to the IC card. The $V_{CC}$ power is used to drive the system, and the Vpp power is used to write data in data memory 65. The supply voltages are set in terminal 11 (or 31) according to answer-to-reset data stored in data ROM 52. A system operation signal from the system clock supply terminal is supplied through a frequency divider 70 to various parts.

Terminal Circuit Construction

Figure 5A:
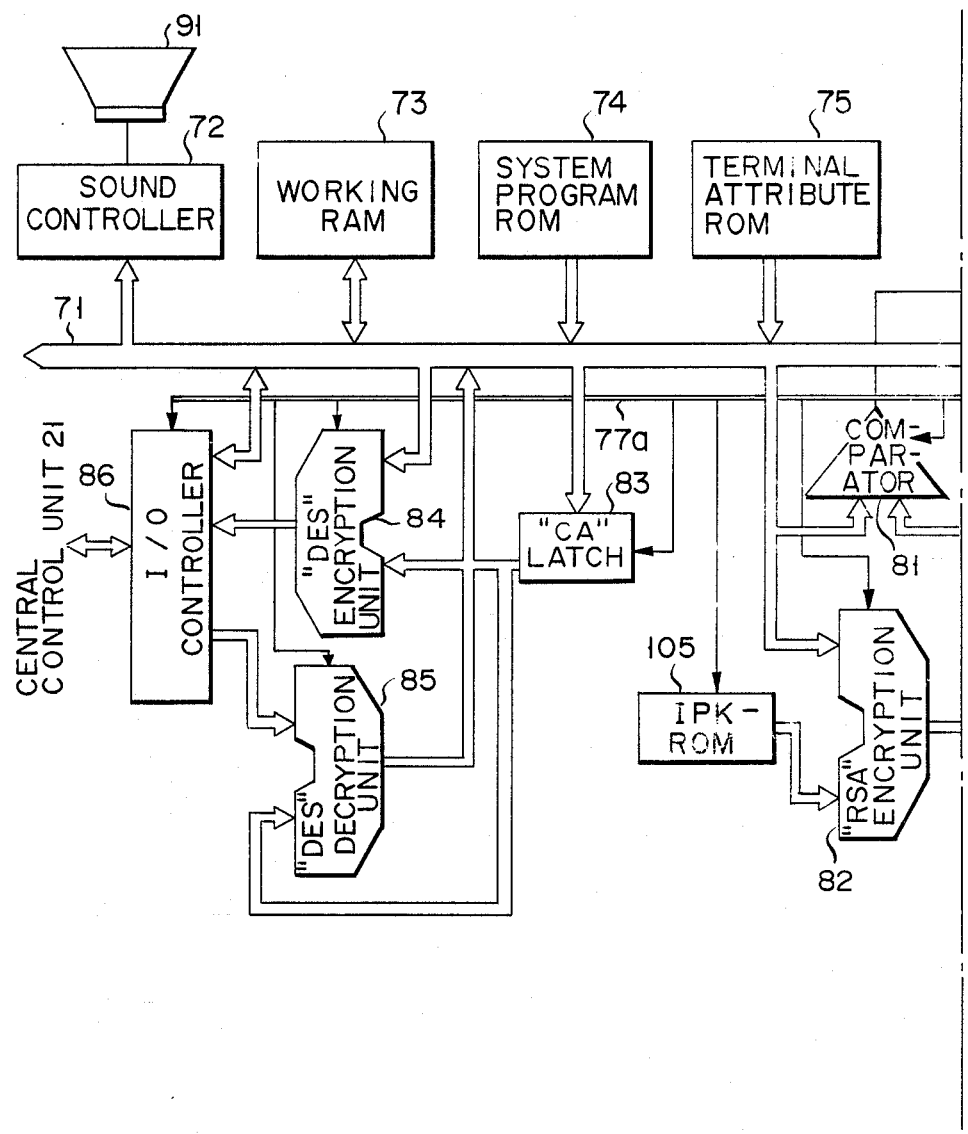
FIGS. 5A and 5B are circuit diagrams of the card holder's IC card terminal and bank clerk's IC card terminal.
Figure 5B:
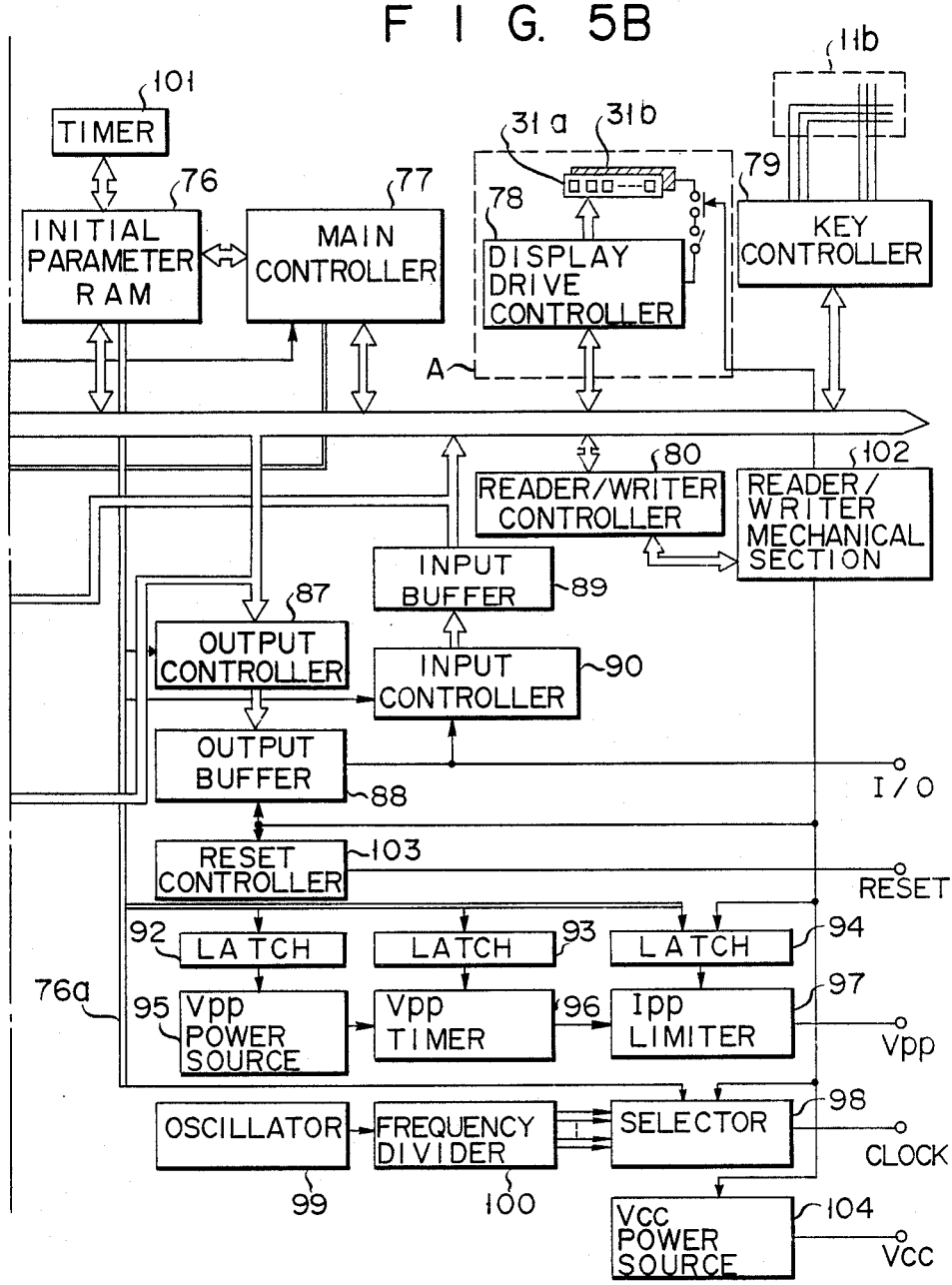

The circuit structures of IC card terminals 11 and 31, which are substantially the same, will now be described with reference to FIGS. 5A and 5B.

Both IC card terminals have system bus 71. Sound controller 72, working RAM 73, system program ROM 74, terminal attribute ROM 75, initial parameter RAM 76, main controller 77, display drive controller 78, key controller 79, reader/writer controller 80, comparator 81, RSA encryption unit 82 for encrypting data on the basis of a well-known RSA algorithm, CA latch 83 for latching CA, DES encryption unit 84 for encrypting data on the basis of a well-known data encryption standard, DES decryption unit 85, input/output controller (I/O controller) 86, output controller 87, and output buffer 88 are connected to system bus 71.

Output buffer 88 is connected to output controller 87, and input controller 90 is connected to input buffer 89.

Loudspeaker 91 is connected to sound controller 72, and generates an alarm, when necessary.

PAN, CHN, EPD and other data supplied from IC card 12 (or 32) and various data are stored in the memory areas of working RAM 73. System program ROM 74 stores various system programs and ENQ (enquiry) code necessary for IC card terminal 11 (or 31) to communicate with IC card 12 (or 32).

Terminal attribute ROM 75 stores terminal code TC, e.g., a manufacture code, issuance code, or shop code, specific to the terminal. The TC code is transmitted to IC card 12 (or 32) in a predetermined format to start the attribute exchange with IC cards 12 (or 32) after the initial parameters have been set in the IC card terminal in accordance with answer-to-reset data from IC card 12 (or 32).

The answer-to-reset data from IC card 12 (or 32) is stored in initial parameter RAM 76. Output controller 87, input controller 90, Vpp level latch 92, Vpp timer latch 93 and Ipp level latch 94 are connected to initial parameter RAM 76 by initial data transmission line 76a. Vpp power supply 95, Vpp timer 96 and Ipp limiter 97 are connected to respective latches 92, 93 and 94. The output line of Vpp power supply 95 is connected to Vpp timer 96, which in turn is connected to Ipp limiter 97. Ipp limiter 97 is coupled to the Vpp output terminal.

The maximum quantity of data transmission from IC card terminal (11 or 31) to IC card 12 (or 32) controlled by main controller 77, the maximum data-writing voltage determined by Vpp power supply 95, the writing-voltage supply time determined by Vpp timer 96 and the maximum data-writing current determined by Ipp limiter 97 are preset by the answer-to-reset data stored in initial parameter RAM 76.

IC card operating frequency selector 98 is connected to data transmission line 76a. The output signal of oscillator 99 is supplied through frequency divider 100 to selector 98. An oscillation signal with the operating frequency thereof preset in selector 98 is supplied from the clock terminal.

Timer 101 is connected to initial parameter RAM 76. Timer 101 counts the maximum wait time from the transmission of the ENQ code or a command to IC card 12 (or 32) according to the answer-to-reset data stored in initial parameter RAM 76. When no answer is given form IC card 12 (or 32) during this wait time, main controller 77 instructs another transmission of the ENQ code or the command or instructs reader/writer controller 80 to make reader/writer mechanism section 102 disconnect IC card 12 (or 32) from the IC terminal.

Comparator 81, RSA encryption unit 82, latch 83 and I/O controller 86 are connected to system control line 77a of main controller 77. A control command is transmitted form main controller 77 to each circuit section.

Display drive controller 78 controls display section 31a and also back light 31b having EL display elements provided on the back of display section 31a. Back light 31b is turned on when IC card 12 (or 32) is inserted into reader/writer mechanism 102 connected to reader/writer controller 80.

Key controller 79 detects key input signal by supplying a key sampling signal to keyboards 11b (or 312).

Reader/writer controller 80 controls reader/writer mechanism section 102. Section 102 includes an IC card transport motor, and it transports IC card 12 (or 32) inserted through IC card inlet 11a (or 311) to a predetermined position and returns the IC card to IC card inlet after a predetermined process. Output buffer 88, reset controller 103, Ipp level latch 94, operating frequency selector 98 and $V_{CC}$ power supply 104 are connected to reader/writer mechanism section 102. Thus, corresponding terminal I/O, Reset, Vpp, Clock and $V_{CC}$ can be set to high impedance only when IC card 12 (or 32) is not inserted.

Output controller 87, which is connected to input/output terminal I/O through input controller 90 and output buffer 88, controls the exchange of data between IC card terminal 11 (or 31) and IC card 12 (or 32) in response to the command supplied from main controller 77 through initial parameter RAM 76.

Input controller 90 supplies data from the IC card to a memory section of working RAM 73 through input buffer 89.

Output controller 87 supplies data from terminal attribute ROM 75 to the IC card through output buffer 88.

The data supplied from IC card 12 (or 32) through input buffer 89 is further supplied to comparator 81 through the bus line. The output of comparator 81 is supplied to main controller 77. Output controller 87 supplies encrypted data from RSA encryption unit 82 to IC card 12 (or 32) through output buffer 88. Encryption unit 82 encrypts PAN supplied from working RAM 73 through system bus 71 according to the public key code supplied from IPK (issuer's public key) ROM 105. IPK ROM 105 stores a public key code corresponding to PRK stored in data memory 65 of the IC card. The public key code is readout when a command is given from main controller 77.

CA code latched in latch 83 is supplied to DES encryption unit 84 and DES decryption unit 85. Specific data is supplied from DES encryption unit 84 to system bus 71. PAN and other data stored in working RAM 73 is encrypted using CA code as key. The encrypted data is supplied to input/output controller 86 according to a command from main controller 77. When controller 86 is connected to central control unit 21, it supplies the encrypted data to central control unit 21. Controller 86 causes DES decryption unit 85 to decrypt the data supplied from the central control unit 21 according to CA code. The decrypted data is supplied to system bus 71.

When I/O controller 86 is connected to central control unit 21, data exchange is performed without the encrypting process. Terminal 11 does not have display drive controller 78 or display unit A.

Operation of the First Embodiment

The operation of the above embodiment will now be described with reference to the flow charts of FIG. 6.

Overall Flow

FIG. 6 is a general flow chart for explaining the overall operation of the customer service system (first embodiment) according to the invention.

After the power supply to central control unit 21 has been started by a bank clerk (step A1), the date and time data are supplied to initialize both IC card terminal 11 and bank clerk's IC card terminal 31.

Subsequently, IC card terminals 11 and 31 are set to a key take-out state in response to a command from central control unit 21 (more precisely, controller 22). At the same time, the menu shown in FIG. 7, i.e., "1. PIN registration," "2. PIN alteration," "3. transaction data check" and "4. card check," is displayed on IC card terminal 11.

No menu is displayed on IC card terminal 31. Terminal 31 is set in a stand-by state for performing menu "1. Transaction Data readout" and "2. forcible writing of PIN". These items of the menu are printed on keyboard 312, near to "1" and "2" keys.

Therefore, terminal 11 or 31, whichever has been first operated for menu selection, is driven.

When "1" key on keyboard 11b of IC card terminal 11 is depressed, step C1 of the PIN registration is executed. When "2" key is operated, step C2 of the PIN alteration is executed. When numeral "3" key is depressed, step C3 of the transaction data check is executed. When numeral "4" key is depressed, the card check processing is executed.

In bank clerk's terminal 31, step B1 of transaction data withdrawal is executed when "1" key on keyboard 31 is depressed. Step B2 of forcible PIN writing is executed when "2" key is operated.

Steps A2, C1 to C4, B1 and B2 will now be described in detail.

Initialization

Figure 8:
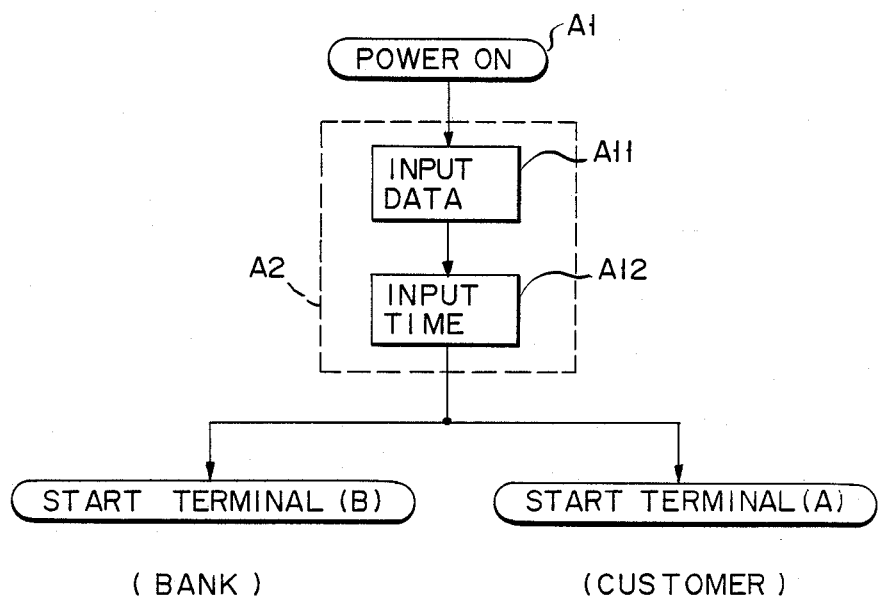
FIG. 8 is a flow chart illustrating an initialization process.

As shown in FIG. 8, first, the power supply to central control unit 21 is turned on by a bank clerk in step A1. Then, step A11 within step A2 is executed, in which the present date is input from keyboard 23. In step A12 within step A2, the time (the hour, minute and second) is input. In consequence, terminals 11 and 31 are put into a stand-by state. Terminals 11 and 31 are initialized every time the power supply is started. Instead, they can be initialized only once, provided that they have means for measuring time so that the date and time are automatically input.

"PIN" registration

Figure 7:
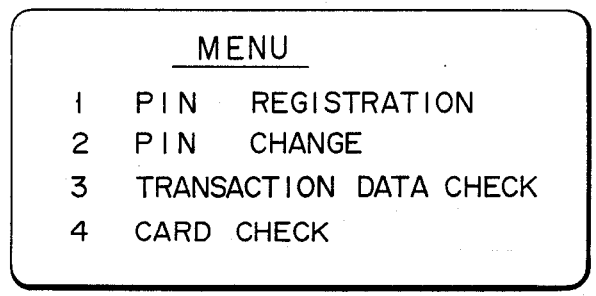
FIG. 7 is a view showing a menu displayed on a CRT display.
Figure 9:
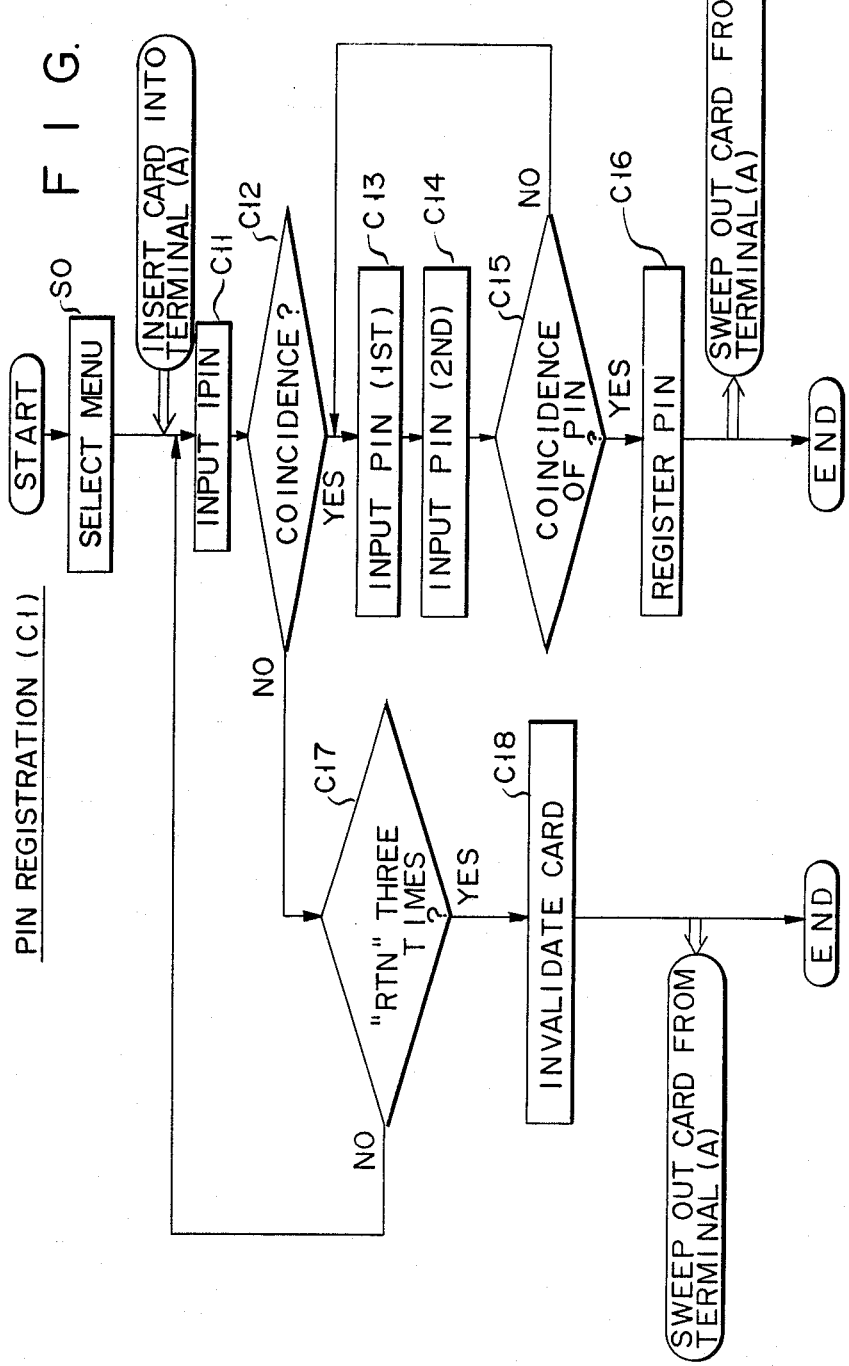
FIG. 9 is a flow chart illustrating a PIN registration process.

When the customer operates numeral "1" key among numerical key pad 11c of keyboard 11b of IC card terminal (A) 11 according to the menu displayed on CRT display 13 as shown in FIG. 7, PIN-registering process C1 (FIG. 9) is executed.

When the process C1 is selected in step S0, a message "Please insert IC card" is displayed on CRT display 13. The card holder inserts his or her IC card 12 into IC card inlet 11a of terminal 11.

As a result, the routine goes to step C11 (FIG. 9), in which the input of IPIN data is waiting.

The IPIN data is a random 6-bit code, for instance, and is used until PIN is written into the IC card by the card holder, as disclosed in detail in U.S. patent application Ser. No. 645,925. It is stored in data memory 65 when the IC card is manufactured. The IPIN-printed sheet is sent, separately from the IC card, to the IC card issuer (e.g., a bank).

When the card holder inputs the IPIN by operating numeral key pad 11c and YES key 11d of keyboard 11b of IC card terminal 11, it is supplied through key controller 79 and bus line 71 to working RAM 73 and is temporarily stored in RAM 73. Then, it is supplied through output controller 87, output buffer 88 and data input/output terminal I/O to IC card 12. In IC card 12, is supplied to input buffer 59 to working RAM 55 and is temporarily stored in working RAM 55. Then it is compared with IPIN data stored in data memory 65 by comparator 63 (step C12).

If the input IPIN is identical with the IPIN stored in data memory 65, RTN is cleared, and the IC card holder is determined to be an authentic IC card holder. Now, the card holder can register his or her PIN.

When the card holder inputs the PIN in the same way as the IPIN is input from keyboard 11b of terminal 11, the PIN is supplied from terminal 11 to IC card 12 and written in working RAM 55 (step C13). As a result, the PIN is displayed on CRT display 13.

When the card holder inputs the PIN again in the same way (step C14), the PIN is written in a separate area of working RAM 55. Then, the PIN input for the first time and PIN input for the second time are compared in step C13.

The PIN is input twice, and the two inputs are compared to prevent the registration of a wrong PIN. (Were the first input, which happens to be a wrong PIN, registered in data memory 65, the IC card could no longer be used, since the card holder can hardly recall the wrong PIN.) If the two inputs are identical, the routine goes to step C16, in which the PIN input by the card holder is stored PIN in data memory 65 through read/write controller 58. If the two data compared in step C15 are not identical, the routine goes back to step C13, in which the card holder inputs the PIN again.

When the PIN is registered, terminal 11 ejects IC card 12 through inlet 11a of terminal 11, thus bringing the sequence of operations to an end.

If the IPIN input in step C12 is not identical with the IPIN stored in memory 65, after RTN in data memory 65 is incremented, step C17 is executed, in which system controller 56 determines whether RTN is "3" or not. If NO, the routine goes to step C11 to input the IPIN once again. If YES, it is determined that the IC card has been illegally used. In step C18, the IC card is invalidated by writing an invalid flag in card status ST. Subsequently, terminal 11 ejects IC card 12 from IC card terminal 11. Once the IC card has been invalidated, it can no longer be used.

"PIN" Alteration

When the PIN is registered, the customer can use IC card 12 as credit card, cash card, etc. In some cases, for example, when the registered PIN has become known to another, it may be desirable to alter the PIN.

Figure 10:
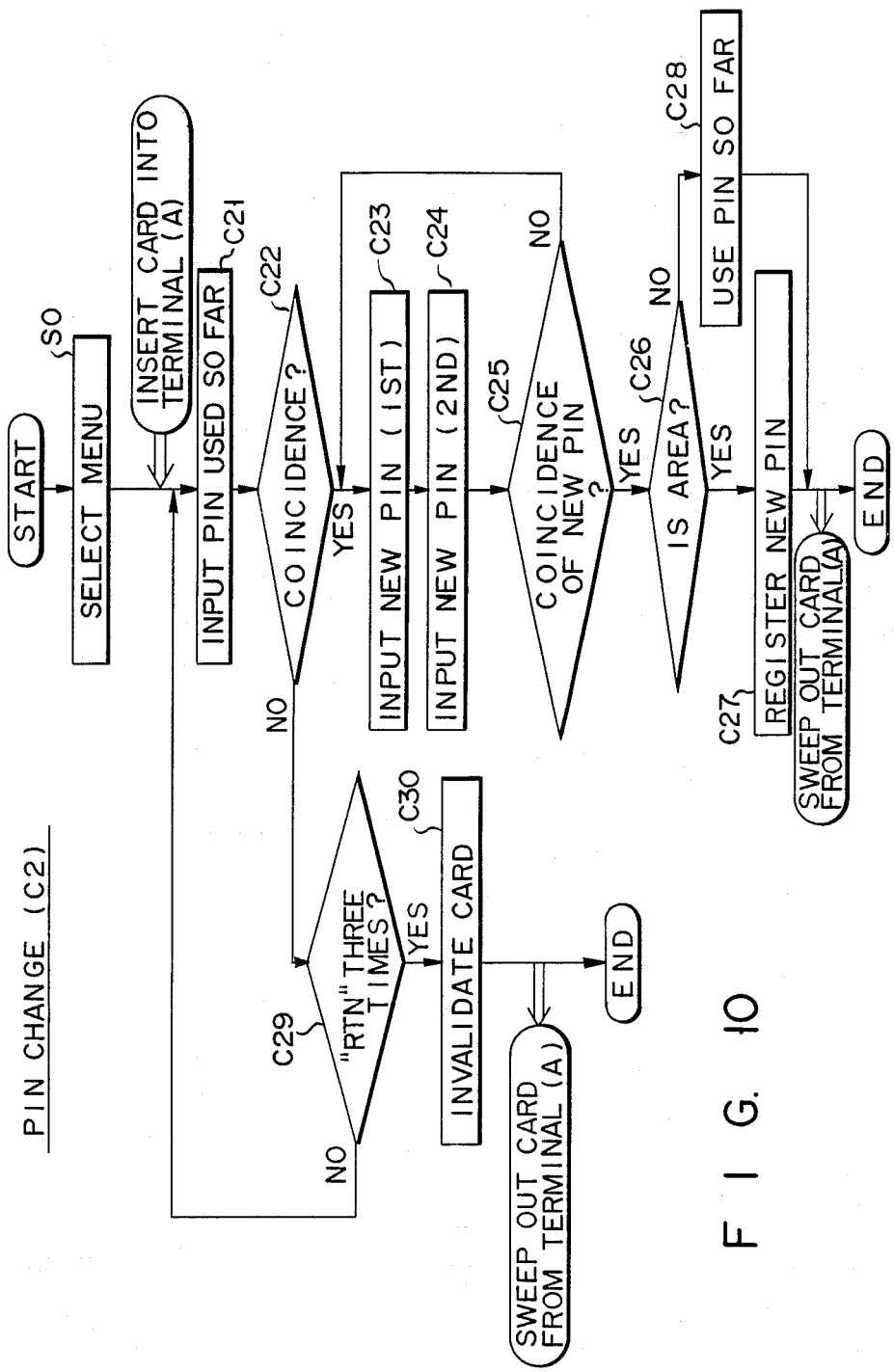
FIG. 10 is a flow chart illustrating a PIN alteration process.

In this case, the card holder takes IC card 12 to the bank, and selects the "2. Pin Alteration" in the menu shown in FIG. 7 by operating numeral "2" key on keyboard 11b of terminal 11. As a result, PIN alteration (step C2) shown in FIG. 10 is executed.

Like the case of the PIN registration noted above, when the card holder loads IC card 12 into terminal 11 after the PIN alteration has been selected in step S0, step C21 is executed. In step C21, the card holder inputs the PIN from keyboard 11b of terminal 11. The PIN is written in working RAM 73 of terminal 11 and then in working RAM 55 of IC card 12, in the same process as the IPIN.

In step C22, the PIN written in working RAM 55 and PIN registered in data memory 65 are compared for comparator 63. If the compared PIN's coincide, the routine goes to step C23, in which the card holder inputs the new PIN twice. In steps C23 through C25, this inputting of two new PIN's is detected in the same manner as in steps C13 to C15. If the two new PIN's coincide, the routine goes to step C26, in which it is determined whether there is a new PIN write area in data memory 65. If YES, the routine goes to step C27, in which the new PIN stored in working RAM 55 is registered in data memory 65 through read controller 58. The PIN data, which has been used so far, is deleted or masked so that it can no longer be read out. When the new PIN is registered, IC card 12 is discharged from terminal 11.

If NO in step C26, the routine goes to step C23, in which the message "PIN Alteration Impossible" is displayed on CRT display 13.

If the two PIN's compared in step C22 are not identical, after RTN is incremented, the routine goes to step C29. In step C29, it is determined whether noncoincidence has occurred three times successively. If YES, step C30 is executed, in which the IC card is invalidated, and it can no longer be used.

Transaction Data Check

In data memory 65 of customer's IC card 12, the transaction data concerning the purchases, receipt of money and payment with respect to the card holder's account is stored.

Accordingly, the system according to the invention allows the card holder to confirm by himself or herself that transaction data stored in the own IC card has been correctly recorded, or to check the amount he or she has spent for purchases.

Figure 11:
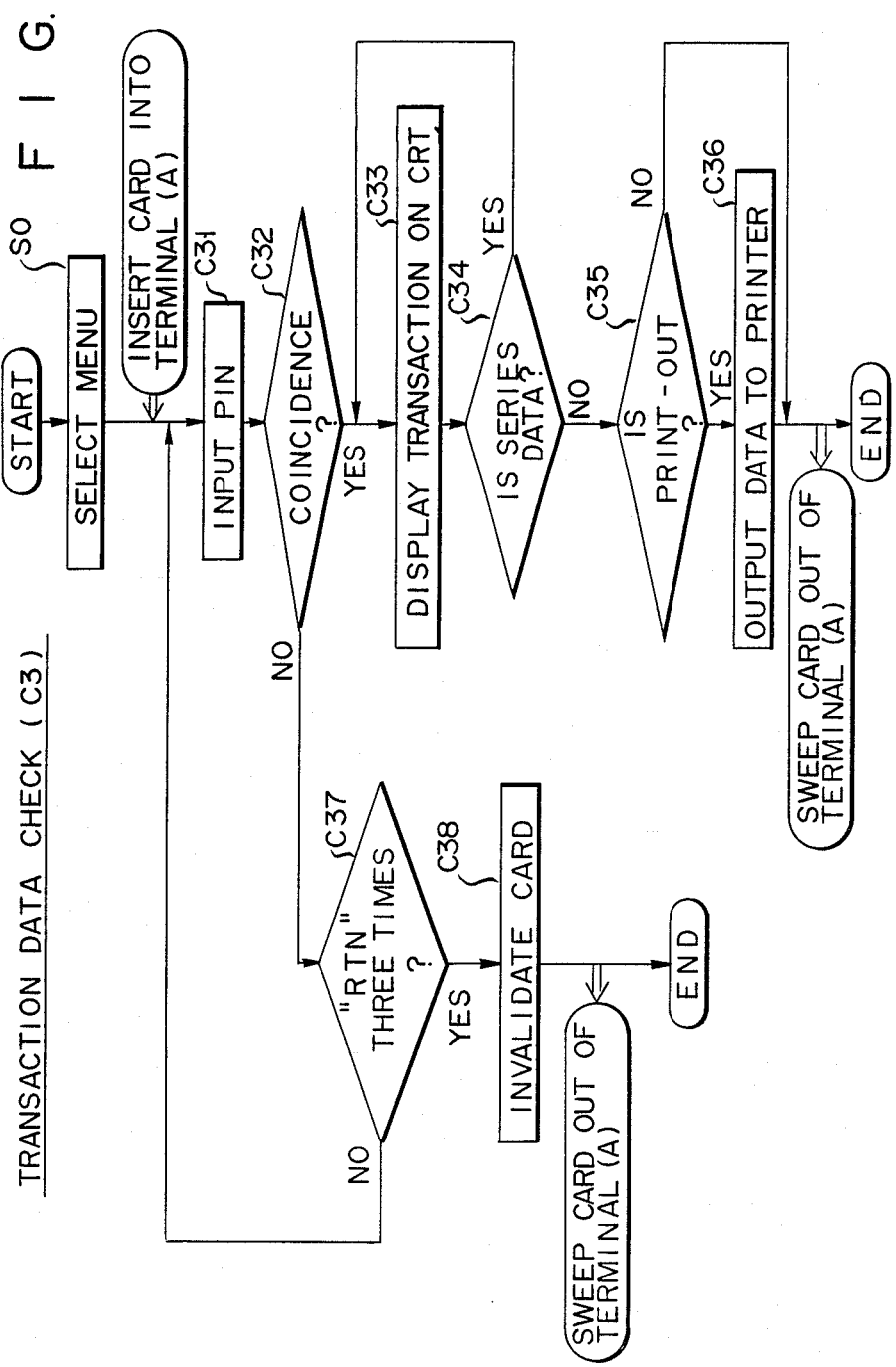
FIG. 11 is a flow chart illustrating a transaction data check process.
Figure 12:
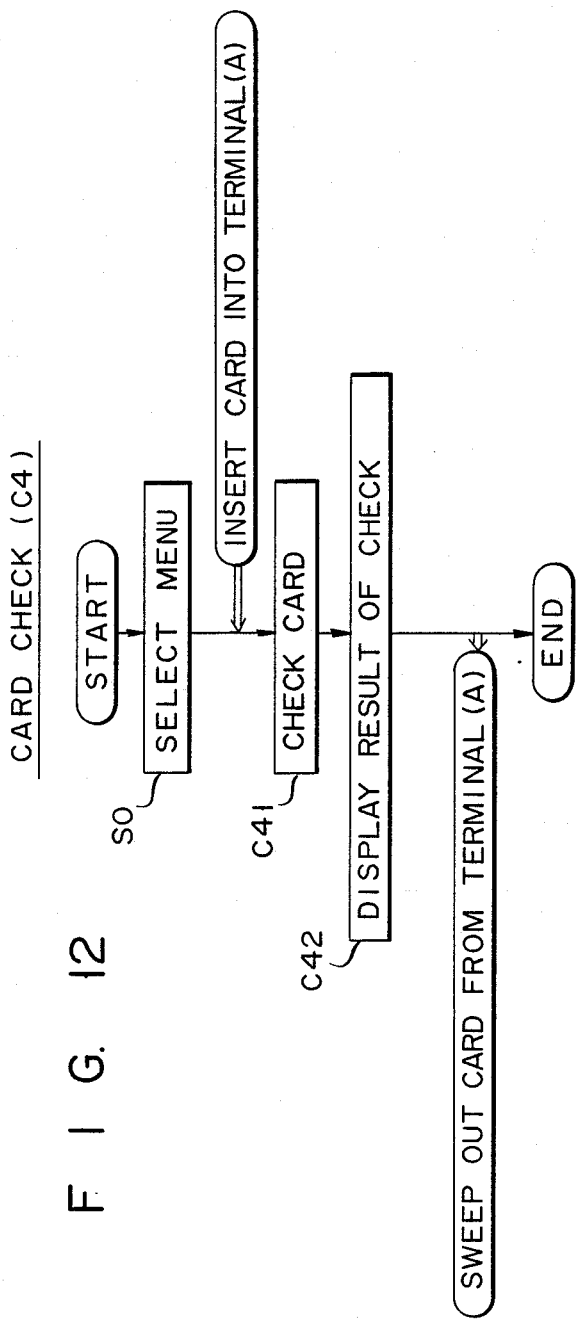
FIG. 12 is a flow chart illustrating an IC card check process.

More specifically, when the card holder operates the "3" key of keyboard 11b of terminal 11, thus selecting item "Transaction Data Check" displayed on CRT display 13, transaction data check step C3 shown in FIG. 11 is executed.

When the card holder loads IC card 12 into terminal 11, step C31 is executed subsequent to such menu selection (step S0). When the customer inputs the PIN from keyboard 11b of terminal 11, the input PIN and the PIN stored in data memory 65 of the IC card are compared by comparator 63 (step C32).

If the two PIN's coincide, step C33 is executed. First, a coincidence signal is supplied to system controller 56 through system control line 56a. As a result, a read signal for accessing a transaction data area of data memory 65 is supplied from the system controller to read/write controller 58, and also a newest address for accessing a transaction data area (TRA) is given from system controller 56 to read/write controller 58.

The data in the accessed TRA is read out through read/write controller 58, bus line 51, output buffer 61, output controller 62 and input/output terminal I/O to terminal 11 and then displayed on CRT display 13. When the card holder depresses YES key 11d after the transaction data has been displayed as one frame on CRT display 13 (step C34), transaction data of the next frame is read out and similarly displayed.

Likewise, when YES key 11d is depressed, step C33 is executed to renew the display frame.

When NO key 11e is depressed after all the transaction data has been read out, step C35 is executed. Transaction data read out from data memory 65 is also supplied to controller 22 of central control unit 21. Thus, in response to the depression of YES key 11d, all transaction data can be printed by printer 25 (step C36).

The data-printing can be inhibited in step C35 in response to the depression of NO key 11e.

When all transaction data is printed, IC card 12 is discharged from terminal 11.

If NO in step C32, step C37 is executed to determine whether or not the content of RTN is "3". If NO, step C31 is executed, in which the card holder inputs the PIN again. If YES in step C37, indicating the non-coincidence has occurred three successive times, step C38 is executed, in which the IC card is invalidated. When the invalidation process of the IC card ends, terminal 11 discharges IC card 12 from terminal 11.

Card Check

The IC card may be invalidated, for example, (a) when a wrong PIN is input three successive times, (b) when no transaction data area is available, and (c) when the data memory is abnormal. However, the card holder cannot understand the cause of the invalidation of his or her IC card. Nor is it possible for him or her to decide as to whether the invalidated IC card can be used again, if the invalidity cause is not shown.

The system according to the present invention is so designed to allow the holder of an invalid IC card to know the status of the IC card. The card check is available for this purpose. Card check step C4 shown in FIG. 6 is selected when the customer operates the "4" key on keyboard 11b of terminal 11 according to the menu display on CRT display 13.

Figure 13:
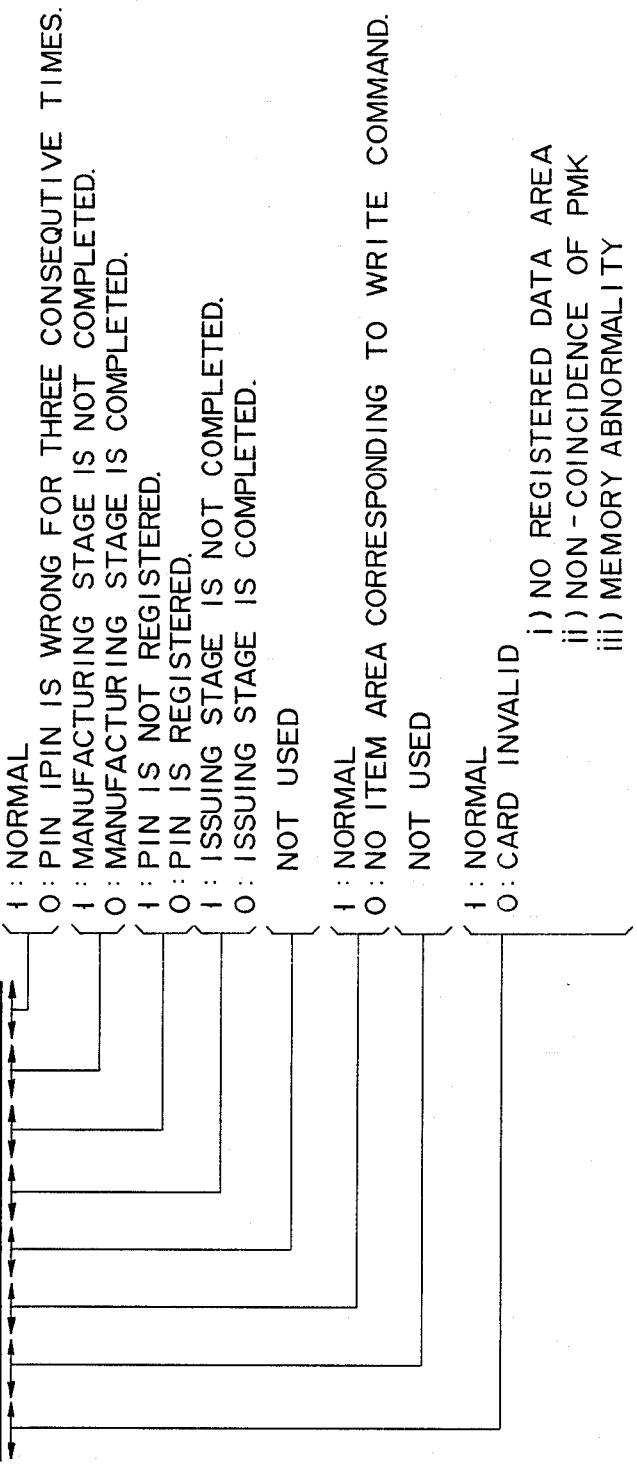
FIG. 13 is a view for explaining card status data.

When the card holder loads IC card 12 into terminal 11 after selecting the card check process (step S0), step C41 is executed. In step C41, the card status ST stored in data memory 65 is checked, as shown in FIG. 13. That is, the cause of the invalidation of the IC card is determined.

FIG. 13 shows the code contents of 8-bit code a–h of card status data ST. Of this 8-bit code, bits b, c and d represent the status of IC card at the end of manufacturing stage, PIN registration stage and IC card issuance stage, respectively. Data "1" indicates that the IC card has not undergone the manufacturing stage, the PIN registration stage, and the issuance stage and data "0" indicates the IC card has undergone the manufacturing stage, PIN registration stage and the issuance stage, respectively. Bit a of "0" that indicates the non-coincidence of the PIN stored in data memory 65 and the PIN input from IC card terminal 11 has occurred three successive times. Data "1" in this case indicates the normal state. Bit f shows that no vacant area for data write command from IC card terminal 11 is available when its value is "0." It shows that such area is available when its value is "1." Bit h of "0" indicates the absence of any registration data area corresponding to IC card terminal 11, the non-coincidence the PMK or the abnormality of data stored in data memory 65, and hence indicates the invalidity of the IC card. Bit h of "1" indicates the normal state. Bits e and g are not used.

In step C41 a check as to whether each bit of card status data (ST) is "1" or "0" is done, the cause of the invalidation of the IC card is checked. The determined cause is displayed on CRT display 13 in step C42.

Subsequently, terminal 11 discharges IC card 12 from terminal 11, thus completing the card check. The card holder informs the bank clerk of the cause of the invalidation to take a necessary measure.

Transaction Data Withdrawal

When using IC card 12 as a so-called debit card or money card, telephone card, etc. with a predetermined amount of money preset in the IC card so that an amount required for every purchase is subtracted, additional deposits (payments into) the account balance may become necessary. Otherwise, when the balance becomes "0", the IC card can no longer used. Further, it is necessary to withdraw transaction data for the file management of the transaction data in the bank.

Figure 14:
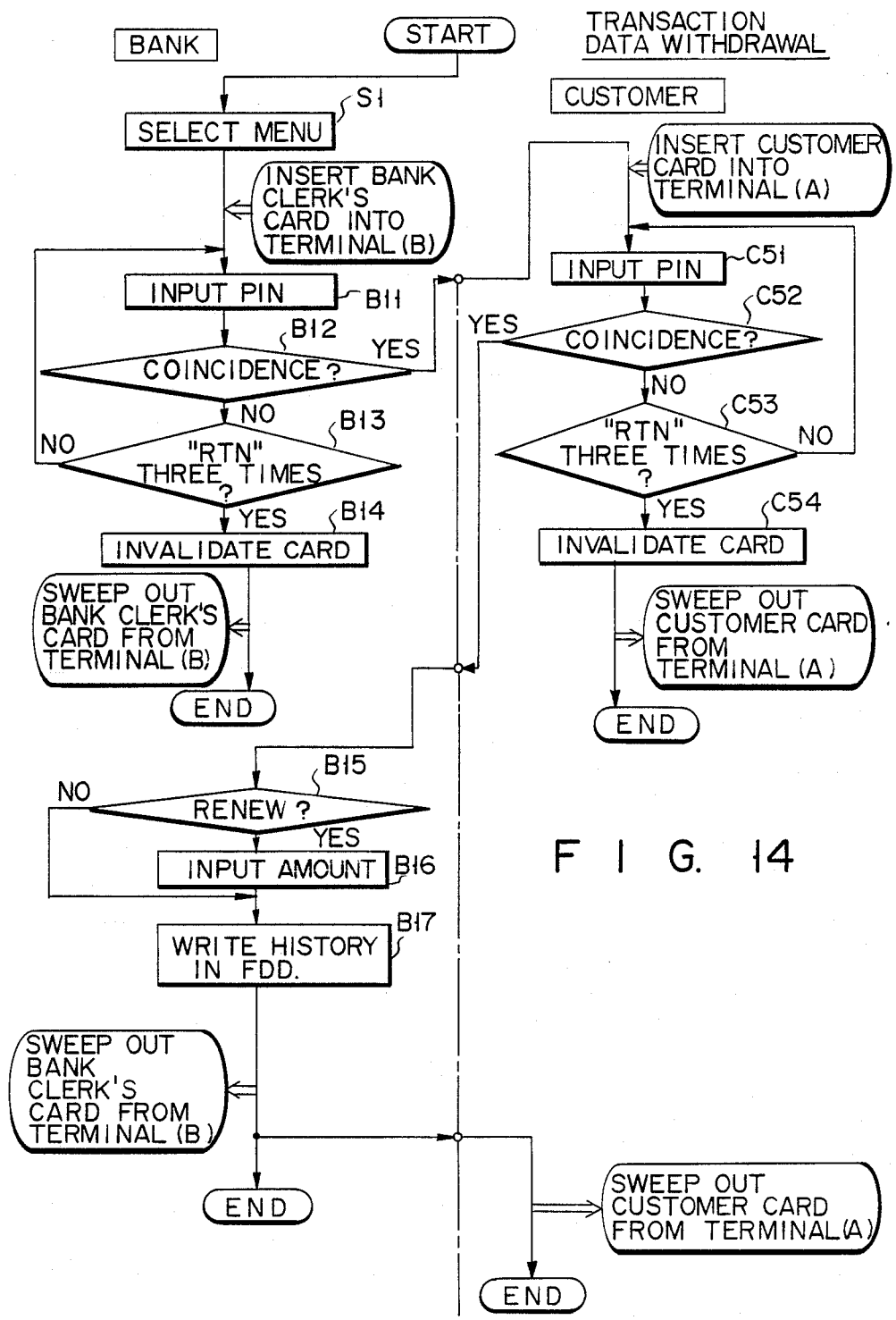
FIG. 14 is a flow chart illustrating a transaction data withdrawal process.

When the "1" key on keyboard 312 of IC card terminal 31 is operated by the authorized bank clerk with central control unit 21 initialized in step A2 in FIG. 6, the transaction data withdrawal is selected to be executed. As a result, the transaction data withdrawal is executed as shown in FIG. 14.

When the bank clerk loads bank clerk's IC card 32 into terminal 31, step B11 is executed. As in customer's IC card 12, a PIN is preliminarily registered in IC card 32. Then, the bank clerk inputs his or her own PIN. Then in step B12, the PIN input in bank clerk's IC card 32 and the preliminarily registered PIN are compared as in the process of customer's IC card 12, noted before.

If the two PIN's coincide, a control signal indicative of this coincidence is supplied from system controller 56 in IC card 32 through terminal 31 to controller 22 of central control unit 21. As a result, the message "Insert IC Card into Terminal" is displayed on CRT display 13 of terminal 11 under control of controller 22, and also terminal 11 is put into operation.

When IC card 12 is loaded in terminal 11 by the card holder, terminal 11 executes step C51.

In step C51, the message "Input PIN" is displayed on CRT display 13. The card holder inputs his or her PIN from terminal 11.

In consequence, in IC card 12 the PIN registered in the IC card and the PIN now input are compared in step C52.

When the compared two PIN's coincide, a control signal indicative of this coincidence is supplied from system controller 56 of IC card 12 through terminal 11 to controller 22. As a result, controller 22 causes terminal 31 to execute step B15.

In step B15, the account balance stored in data memory 65 of IC card 12 is increased, and a check is done as to whether a new amount of money has been input. For example, when the balance has become zero, step B16 is executed. In step B16, the new amount of money input from terminal 31 by the bank clerk is written in data memory 65 of IC card 12.

If there is a previous balance at this time, the deposit amount and the sum of the deposit amount and previous balance are written in data memory 65. If it is determined in step B15 that the account balance has not been altered, step B17 is executed.

In step B17, the new amount of the account balance, name of the card holder, account number, data in the transaction area, name of the bank clerk in charge and history such as date and time, are written in FDD 24 of central control unit 21. Bank clerk's IC card 32 is discharged from terminal 31, and IC card 12 is discharged from terminal 11. FDD 24 with the history written therein is subsequently kept in the bank.

If it is determined in step B12 that the PIN input by the bank clerk and the PIN stored in bank clerk's IC card 32 do not coincide, step B13 is executed. In step B13, a check is done as to whether the number of times of non-coincidenced stored in RTN is "3". If NO, step B11 is executed, so that it becomes possible to input the PIN once again. If YES in step B13, step B14 is executed, in which the IC card is rendered invalid. Bank clerk's IC card 32 is then discharged from terminal 31.

If it is determined in step C52 that the PIN input by the customer and the PIN in IC card 12 do not coincide, step C53 is executed. If it is found in step C53 that the number of successive occurrences of the non-coincidence not 3, it is made possible to input PIN once again. If it is detected that the non-coincidence has occurred three times successively, step C54 is executed, in which IC card 12 is rendered invalid, and discharged from terminal 11.

Forcible PIN Writing

As in process C1, the card holder registers a PIN which is known only to himself or herself in IC card 12. The PIN usually consists 4 to 6 digits. Therefore, it is often liable that the card holder forgets his or her own PIN.

In such a case, it is no longer possible to alter the PIN as in process C2, so that IC card can no longer be used.

The system according the invention provides the customer with a service that a new PIN can be registered in the presence of a bank clerk when and only when the IC card holder can be confirmed to be the authentic IC card holder.

Figure 15:
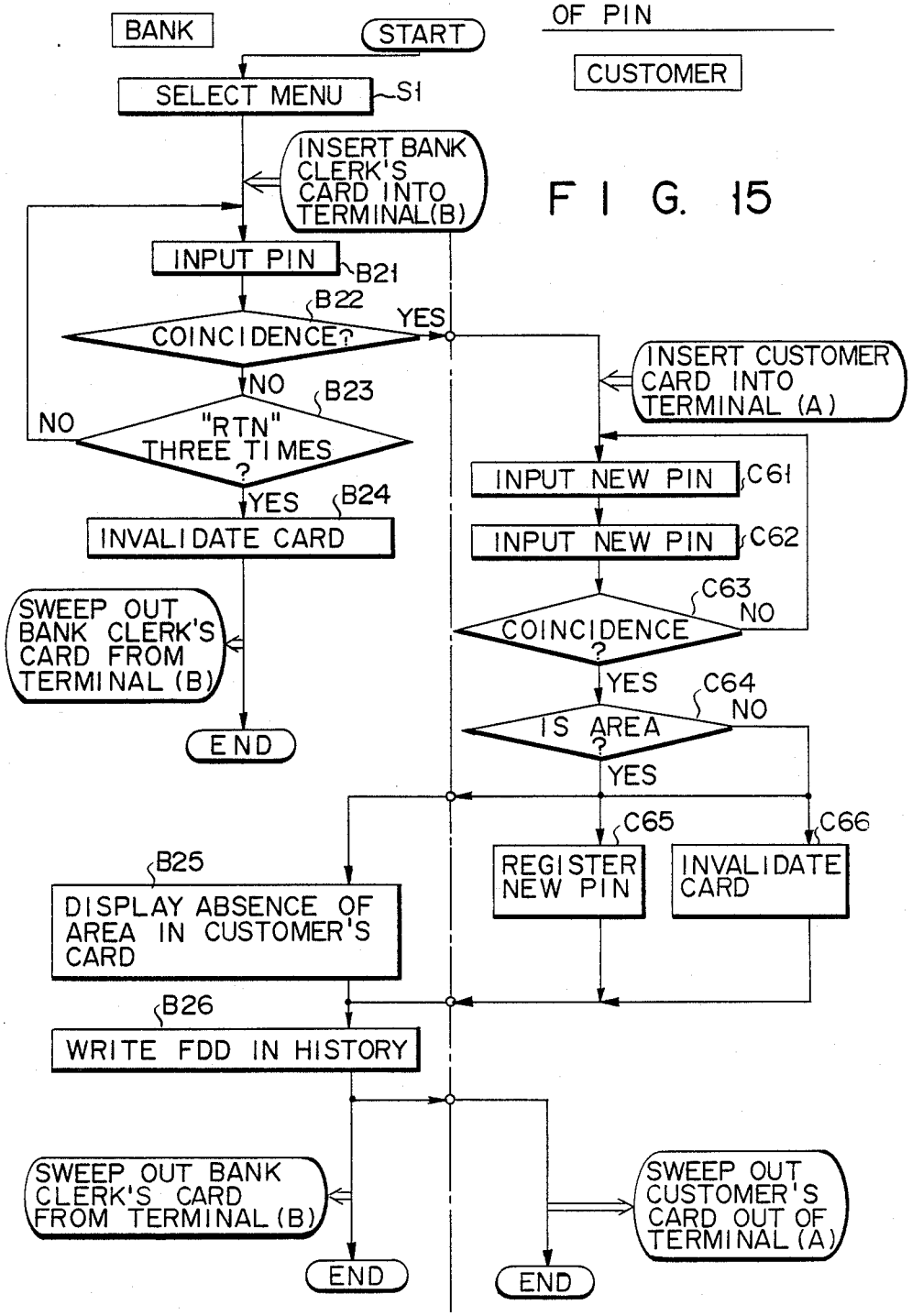
FIG. 15 is a flow chart illustrating a forcible PIN-writing process.

More specifically, when the bank clerk operates the "2" key on keyboard 312 of IC card terminal 31 after initialization of central control unit 21, the forcible PIN writing is selected as a menu item, and the forcible PIN writing (as shown in FIG. 15) is executed.

When bank clerk's IC card 32 is loaded in terminal 31 after the menu item selection (step S1), step B21 is executed. In step B21, the authorized bank clerk inputs the PIN of his or her own IC card 32. If coincidence is detected in step B22, the message "Load IC Card in Terminal" is displayed on CRT display 13. Then, the card holder loads his or her own IC card 12 in terminal 11.

Then, as in the PIN registration process (step C1) and PIN alternation process (step C2), new PIN is input twice (steps C61 and C62), and a check is done in step C63 as to whether the two PIN's are identical.

If the two PIN's are identical, a check is done in step C62 as to whether there is a vacant area in data memory 65 of IC card 12. If YES, the input new PIN is registered again in the data area.

If it is determined in step C64 that there is no area, customer's terminal 11 executes step C66, in which IC card 12 is invalidated. At the same time, the invalidity of the IC card due to absence of area is displayed on CRT display 13. Further, the bank clerk's terminal 31 executes step B25 to display the absence of area in the IC card 12 in display section 31a of terminal 31.

Finally, step B26 is executed, in which the card holder's name, account number, name of the bank clerk in charge, the fact that the new PIN has been registered and history data such as date and time are written in FDD 24.

When step B26 is ended, IC card 12 is discharged from terminal 11, and also bank clerk's IC card 32 is discharged from terminal 31. If it is determined in step B23 that a wrong PIN has been input three times successively, bank clerk's IC card 32 is rendered invalid (step B24), and then is discharged form terminal 31.

Modifications of the First Embodiment

In the above embodiment two IC card terminals, i.e., terminal 11 and bank clerk's IC card terminal 31, which have substantially the same circuit construction, are connected to the central control unit. However, this is by no means limitative. For example, bank clerk's IC card terminal 31 may have more features including the function of central control unit 21, and it may be directly connected to IC card terminal 11. Conversely, the customer's IC card terminal may have more features.

Further, the services which can be provided to the card holder are not limited to the six different services noted above, and other services may also be provided.

The collation data according to the invention is a wide concept and includes IPIN and PIN. Further, the names and functions of the data are by no means limitative. Further, the secret data according to the invention is not limited to transaction data.

In the above embodiment the system is adapted to an off-line system, i.e., all data is stored in the FDD, finally. However, the system may be adapted to an on-line system, i.e., data is directly stored in a host computer utilizing an on-line system network.

Advantages of the First Embodiment

In the first embodiment of the customer service system for an IC card system, various customer service menu items such as (1) the registration of PIN in IC card, (2) the alteration of registered PIN, (3) the check of transaction data stored in IC card, and (4) the check of the internal status of IC card are selected by the card holder, using the IC card terminal installed in a bank or the like.

Thus, with the system of the first embodiment the card holder can receive such services as the PIN registration, PIN alteration, confirmation of transaction and confirmation of the IC card status without help of the bank clerk or the IC card issuer. This preserves personal secrecy and improves services to the card holder.

Further, in the first embodiment of the customer service system, the IC card issuer's (or bank clerk's) IC card terminal and the card holder's IC card terminal are provided, and verification of the IC card issuer is achieved by using the bank clerk's IC card terminal and issuer's (or bank clerk's) IC card before starting the card holder's IC card terminal to effect registration of the collation data such as PIN or secret data read-out such as transaction data with respect to the customer's IC card.

In the first embodiment, the IC card terminal 11 is started after the identification of the IC card issuer has been effected by using the card issuer's (bank clerk's) IC card terminal and IC card issuer's (bank clerk's) IC card. Hence, PIN alteration, transaction data withdrawal, etc. can be performed under proper control of the IC card issuer. Thus, the card holder's various demands can be sufficiently met, while preventing the use of forged IC cards.

[SECOND EMBODIMENT]

Now, a second embodiment of the invention will be described with reference to the drawings.

Figure 16:
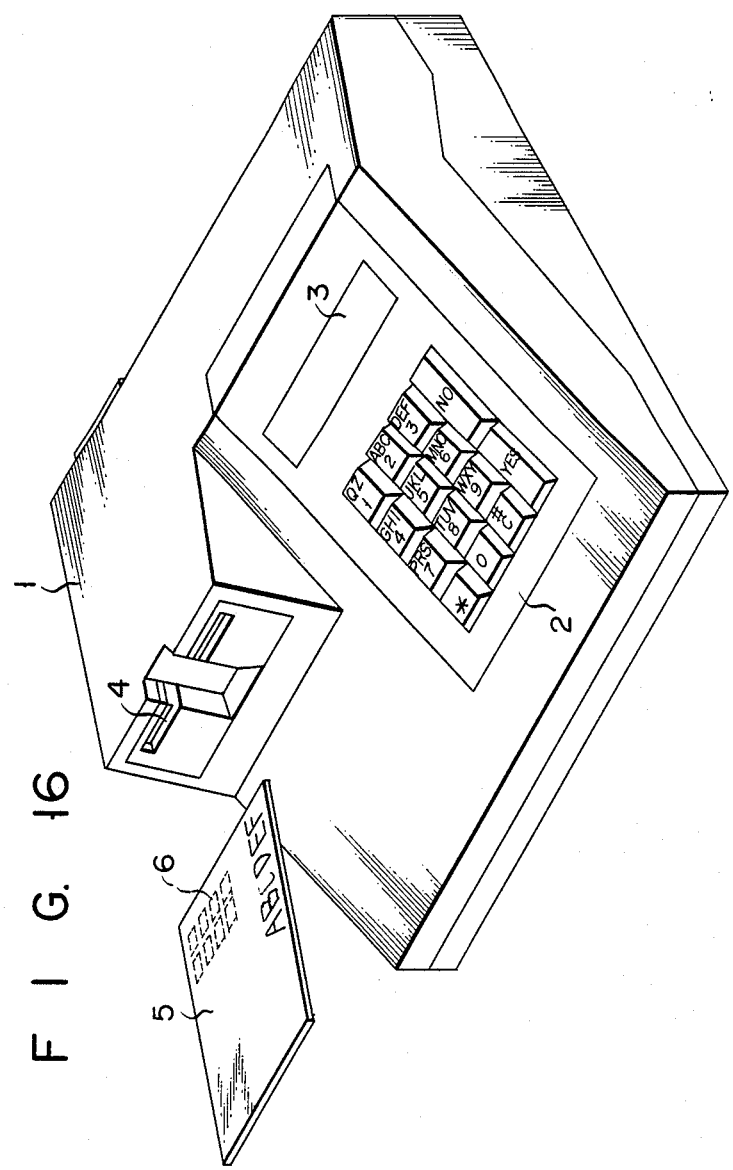
FIG. 16 is a perspective view showing the IC card terminal used in a second embodiment of the invention.

FIG. 16 shows the outer appearance of a terminal. Referring to the figure, terminal 1 is provided with keyboard 2 with numeral keys, display section 3 for displaying messages and input data digit numbers to be described later and IC card inlet 4 in an IC card loading section. IC card 5 is loaded in IC card inlet 4. IC card 5 has an internal IC circuit, and it also has connector 6 provided on top.

FIG. 17 shows the circuit of the above terminal 1. As shown in this figure, the circuit has an input section corresponding to the keyboard noted above for inputting a PIN. The output of input section 111 is supplied to register 112 and counter 110. The output of register 112 is distributed through data distributor 113 to comparator 114, register 115 and serial I/O 116. The output of register 115 is distributed through data distributor 117 to comparator 114 and serial I/O 116. Control section 118 supplies initialize signal 119 to registers 112 and 115. It also supplies read/write signals 120 and 121 to registers 112 and 115. The first PIN supplied from input section 111 is stored in register 112. The PIN input for the second time is stored in register 112 after the content of register 112 is shifted to register 115. Control section 118 supplies select signals 122 and 123 to data distributors 113 and 117. It also distributes data read out from registers 112 and 115. Comparator 114 compares the pieces of data in registers 112 and 115. When these pieces of data are identical, it supplies a coincidence signal to controller 118 and also to data selector 124. Data selector 124 supplies data select signal to display data memory 125. In memory 125, various messages to the IC card holder are stored. Message data selected in data selector 124 is displayed in message display section 126A of display section 126. Counter 110 counts digits forming the PIN supplied from input section 111, and it supplies digit data being input to the display section 126 so that it is displayed on digit number display section 126B. When the input of data is ended, input section 111 supplies input end signal 127 to control section 118 and counter 110, thus causing controller 118 to perform the next operation and resetting counter 110.

Figure 18:
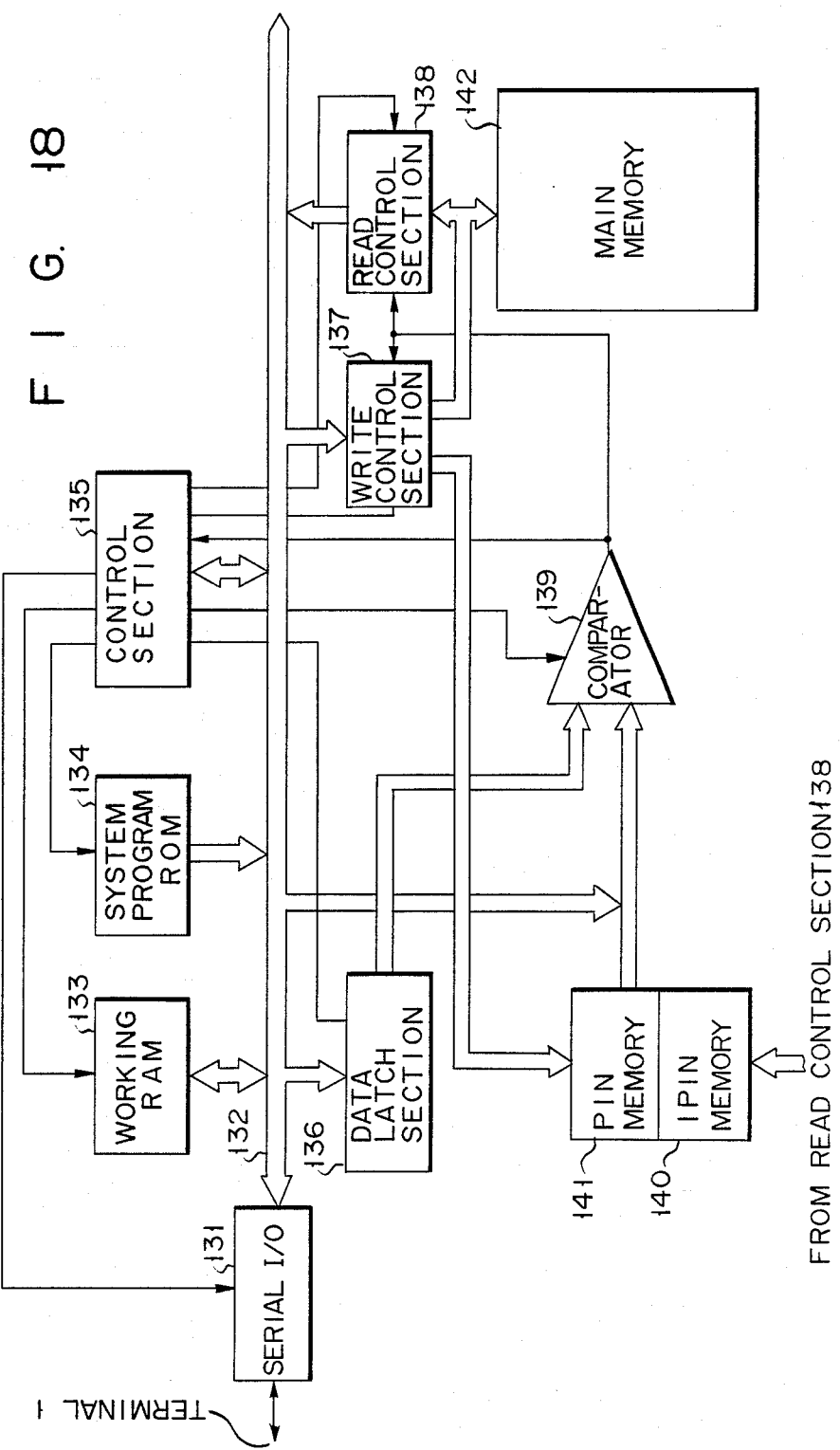
FIG. 18 is a block diagram showing the circuit of an IC card used in the same embodiment.

FIG. 18 shows the circuit of IC card 5 loaded in terminal 1. As shown in this figure, the circuit has a serial I/O connected to system bus 132. Working RAM 133, system program ROM 134, controller 135, data latch section 136, write control section 137, read control section 138, IPIN memory 140 and PIN memory 141 are connected to system bus 132.

Working RAM 133 stores various data supplied from the terminal and also stores process data in IC card 5. System program ROM 134 stores system programs for controlling various circuits in IC card 5, and also it has a code signal indicative of whether the signal transferred from the terminal is correct. Control section 135 gives an operation command to each circuit according to data supplied through system bus 132 or operating status. In data latch section 136, data supplied from the terminal is latched.

Comparator 139 is connected to data latch section 136. Comparator 139 compares the data latched in data latch section 136 with the data in IPIN memory 140 or PIN memory 141. When the compared pieces of data are identical, comparator 139 supplies a coincidence signal to control section 135, write control section 137 and read control section 138. Control section 135 supplies an operation command to comparator 139. Write control section 137 supplies a write command to IPIN memory 140, PIN memory 141 and main memory 142. Read control section 138 gives a read command to main control section 142, IPIN memory 140 and PIN memory 141. In this case, IPIN memory 140 and PIN memory 141 may be provided in main memory 142. These memories are constituted by EP-ROMs and EEP-ROMs.

The operation will now be described in the case where the PIN of the IC card is altered by the IC card holder.

In this case, to alter the PIN, the IC card holder loads IC card 5 into the terminal through IC card inlet 4 of terminal 1. In this state, the card holder inputs his or her PIN from keyboard 2, i.e., input section 111 shown in FIG. 17. As a result, the input data is written in register 112, then supplied through data distributor 113 to serial I/O 116 and thence transferred to the IC card under a command from control section 118.

Figure 19:
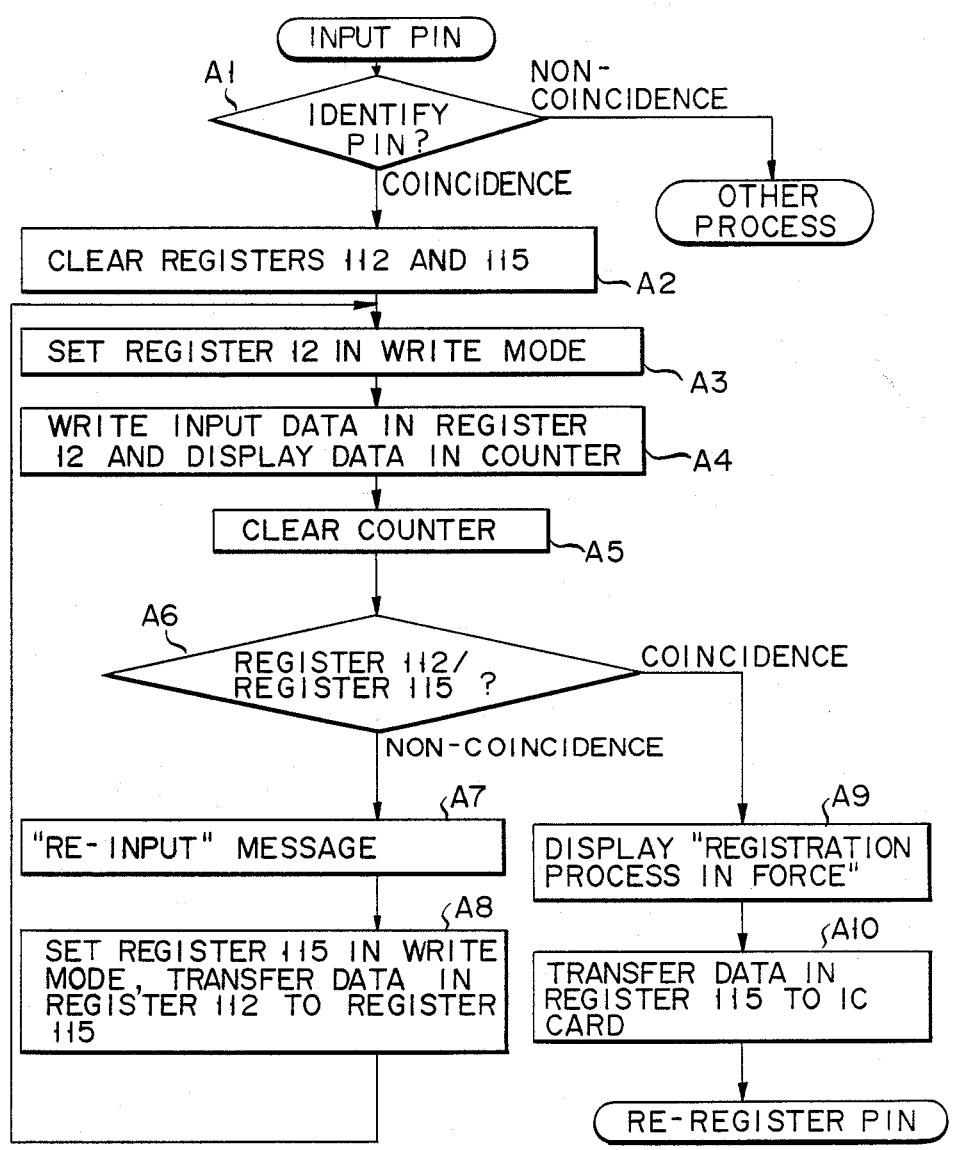
FIG. 19 is a flow chart illustrating the operation of the same embodiment.

In the IC card, the PIN supplied through serial I/O 131 shown in FIG. 18 is latched in data latch 136 under a command from control section 135, and compared by comparator 139 with PIN data stored in PIN memory 141. When the PIN's are identical, comparator 139 produces a coincidence signal. This coincidence signal is supplied to control section 135. In response to a command from control section 135 the data is transferred through serial I/O 131 to terminal 1. In terminal 1, when the coincidence signal is received by serial I/O 114, it is given to control section 118. As a result, it is confirmed that the PIN preliminarily written in IC card 5 and the PIN input from terminal 1 are identical, that is, YES is yielded step A1 (FIG. 19). Then, the routine goes to step A2. In step A2 the contents of registers 112 and 115 are cleared by the initialization signal supplied from control section 118. The routine then goes to step A3, in which register 112 is set to the write mode by read/write control signal 120 supplied from control section 118.

In this state, the IC card holder inputs a new PIN from input section 111 to alter the PIN data. The routine then goes to step A4, in which the PIN is written in register 112. In this case, the number of digits of the new PIN is counted by counter 110, and this number is displayed by digit number display section 126A in display section 126, not in numerals, but in symbols, such as " *" for the first digit, " **" for the first two digits, and so forth. This eliminates the possibility that any other person can see the PIN, which is a numerical code.

The routine then goes to step A5. In step A5, upon inputting all data into input section 111, that is, when the YES key on keyboard 2 of terminal 1 is pushed, an input end signal 127 is provided from input section 111. As a result, counter 110 is stopped, and the internal count is reset. Also, control section 118 causes the next operation.

Then, step A6 is executed, in which registers 112 and 115 are set to the read-out mode by read/write control signals 120 and 121 supplied from control section 118. Further, the data stored in registers 112 and 115 is supplied through select signals 122 and 123 to distributors 113 and 117. In this state, the pieces of data stored in registers 112 and 115 are compared by comparator 114. Since in the content of register 115 has been cleared by the first input PIN, non-coincidence is detected. The routine goes to step A7. In step A7, the non-coincidence output of comparator 114 is supplied to data selector 124. Data selector 124 selects from display data memory 125 a message instructing the card holder to input PIN again. This message is displayed on message control section 126A.

The routine then goes to step A8. In step A8, in response to the non-coincidence output of comparator 114, control section 118 provides select signal 122 to data distributor 113 so that register 112 is connected to register 115. Further, read/write control signal 121 is supplied from controller 118 to register 115, setting register 115 to the write mode. As a result, the content of register 112 is transferred to register 115.

In this state, the routine returns to step A3. In step A3, the PIN input afresh by the IC card holder is written in register 112. Subsequently, the routine goes through steps A4 and A5 to step A8, whereby the pieces of data in stored registers 112 and 115 are compared. When these pieces of data coincide, the routine goes to step A9. In step A9, comparator 114 gives a coincidence signal data selector 124. Data selector 124 selects a message, for instance, "PIN Has been Confirmed and Is being Registered," from display data memory 125. The selected message is supplied to display section 126 and is displayed by message display section 126A. The routine then proceeds to step A10. In step A10, the coincidence signal output by comparator 114 supplied to control section 118, and a select signal 123 is supplied to data distributor 117. The data stored in register 115 is thereby supplied to the IC card through serial I/O 116.

In IC card 5, the data is supplied through serial I/O 131. As a result, a write control signal is supplied from write control section 137 to PIN memory 141 under control of control section 135. Thus, the data from terminal 1 is written in PIN memory 141, whereby the PIN alteration is completed.

While the description so far was concerned with the alteration of the PIN, the same procedure is taken in case of registration of a new PIN. More specifically, when the previously known IPIN is input from input section 111, it is written in register 112 under the control of a command from control section 118, to be supplied through data distributor 113 to serial I/O 116 and thence supplied to IC card 5. In IC card 5, when the data is supplied through serial I/O 131 shown in FIG. 18, it is latched in data latch section 136 under the control of a command from control section 135, and is compared with the IPIN written in IPIN memory 140. When the compared IPIN's coincide, a coincidence signal is supplied to control section 135, and the PIN data is supplied through serial I/O 131 to the terminal under the command of control section 135. In terminal 1, the coincidence signal is received in serial I/O 116 and is supplied to control section 118. As a result, it is confirmed that the PIN preliminarily written in IC card 5 and IPIN input from the terminal are identical. Hence, it becomes possible to input the "PIN". Thereafter, the PIN is input twice, as in re-registering the PIN.

As has been shown in the above embodiment, not only registration of a new PIN but also the alteration of the PIN is possible. In these two registrations, the PIN is input twice to permit registration. Thus, it is possible to prevent the inputting of a wrong PIN, ensuring a reliable and correct registration of the PIN in IC card 5. Further, since the input PIN is not displayed in numerals on the display section, but in symbols, there is no read-out of the PIN visible to another nearby person. Total security can thus be ensured.

The above embodiment is by no means limitative. Various changes and modifications are possible without departing from the scope and spirit of the invention. For example, the PIN can be input more than twice. Further, the invention is applicable not only to the registration of a PIN in the IC card but also to registration of other data.

Advantages of the Second Embodiment

With the second embodiment of the IC card system, the PIN is input at least twice from the terminal, and these PIN's are stored in separate memory means. The pieces of data in these memory means are compared. When they are identical, the PIN is registered in the IC card.

Thus, with the second embodiment it is possible to ensure an accurate registration of the PIN in the IC card by the IC card holder. In addition, the alteration of the PIN becomes possible when predetermined conditions are met. It is thus possible to reliably prohibit any subsequent use of the IC card. This improves the security of the system.

What is claimed is:

1. A customer service system for use in an IC card system comprising:
   a customer's IC card including at least an IC circuit
      having first memory means for storing the personal identification number of a customer, second memory means for storing secret data, interface means for controlling the output of data from said IC card and input of data to said IC card, comparator means for comparing data input through said interface means with data stored in first memory means, and control means for controlling said first and second memory means, said interface means and comparator means in accordance with selective execution of a plurality of predetermined items of a customer service menu;

display means;

display control means for causing said display means to display the items of the customer service menu and to display necessary data including messages, once or repeatedly, in accordance with selective execution of said items of menu; and customer's IC card read-write means including a loading section for loading said customer's IC card, a key input section for inputting data necessary to select one of said items of the customer service menu displayed on said display means under the control of said display control means and to exchange data between said customer's IC card read-write means and said customer's IC card loaded in said loading section, an interface section for controlling the output of data to said customer's IC card or to said display control means, and the input of data from the customer's IC card or from key input section, and a control section for controlling said loading section, key input section and interface section in accordance with the selective execution of said items of the customer service menu;

whereby said customer service system provides predetermined services in addition to ordinary transaction services to the customer, by permitting an access to said first and second memory means in accordance with one of the selected items of the customer service menu when said comparator means produces a coincidence output.

2. The system according to claim 1, wherein one of said items of the customer service menu is a process of registering a personal identification number.

3. The system according to claim 1, wherein one of said items of the customer service menu is a process of altering a personal identification number.

4. The system according to claim 1, wherein one of said items of the customer service menu is a process of checking transaction data.

5. The system according to claim 1, wherein one of said items of the customer service menu is a process of checking card status.

6. The system according to claim 1, which further comprises:

an issuer's IC card including at least an IC circuit having memory means for storing IC card issuer's identification data, interface means for controlling the output of the data from said issuer's IC card and input of data to said issuer's IC card, comparing means for comparing the data input to said issuer's IC card through said interface means with the data stored in said memory means, and control means for controlling said memory means, interface means and comparing means in accordance with the item of the customer service menu;

issuer's IC card read-write means including a loading section for loading said issuer's IC card therein, a key input section for inputting data necessary to execute one of said items of the customer service menu and for data exchange between said issuer's IC card loaded in said loading section and said issuer's IC card read-write means, an interface section for controlling the input of data to said issuer's IC card loaded in said loading section and the output of data from said issuer's IC card or said key input section, and a control section for controlling said loading section, key input section and interface section in accordance with the item of said customer service menu; and starting means for starting said customer's IC card read-write means, display control means and display means when said comparing means produces a coincidence output;

whereby said system provides a predetermined service in cooperation with the IC card issuer by permitting the accessing to said first and second memory means in accordance with one of the items of the customer service menu when said start means is driven.

7. The system according to claim 6, wherein said item of the customer service menu is a process of withdrawing transaction data.

8. The system according to claim 6, wherein said item of the customer service menu is a process of forcibly writing a personal identification number.

9. The system according to claim 1, wherein the comparison is done by said comparing means a plurality of successive times, and if coincidence outputs are obtained in the plurality of comparisons, a new personal identification data can be written in said first memory.

* * * * *

UNITED STATES PATENT AND TRADEMARK OFFICE
CERTIFICATE OF CORRECTION

PATENT NO. : 4,752,677
DATED      : June 21, 1988
INVENTOR(S): NAKANO et al

It is certified that error appears in the above-identified patent and that said Letters Patent is hereby corrected as shown below:

Title page, left-hand column, under "U.S. Patent Documents"
insert -- 
| | | |
|---|---|---|
| 4,498,000 | 2/85 | Decavele et al |
| 4,594,663 | 6/86 | Nagata et al |
| 4,544,833 | 10/85 | Ugon |
| 4,528,442 | 7/85 | Endo |
| 4,650,975 | 3/87 | Kitchener |
| 4,683,372 | 7/87 | Matsumoto |

Signed and Sealed this

Twenty-third Day of May, 1989

Attest:

DONALD J. QUIGG

*Attesting Officer*  *Commissioner of Patents and Trademarks*